US012191045B2

United States Patent
Singh et al.

(10) Patent No.: US 12,191,045 B2
(45) Date of Patent: Jan. 7, 2025

(54) STACKABLE NUCLEAR WASTE STORAGE SYSTEM

(71) Applicant: HOLTEC INTERNATIONAL, Camden, NJ (US)

(72) Inventors: Krishna P. Singh, Jupiter, FL (US); Stephen J. Agace, Middletown, DE (US)

(73) Assignee: HOLTEC INTERNATIONAL

( * ) Notice: Subject to any disclaimer, the term of this patent is extended or adjusted under 35 U.S.C. 154(b) by 13 days.

(21) Appl. No.: 17/746,599

(22) Filed: May 17, 2022

(65) Prior Publication Data

US 2022/0367078 A1    Nov. 17, 2022

Related U.S. Application Data

(60) Provisional application No. 63/189,383, filed on May 17, 2021.

(51) Int. Cl.
  *G21F 5/10*   (2006.01)
  *G21F 5/008*  (2006.01)
  *G21F 5/12*   (2006.01)

(52) U.S. Cl.
  CPC .......... *G21F 5/10* (2013.01); *G21F 5/008* (2013.01); *G21F 5/12* (2013.01)

(58) Field of Classification Search
  CPC ............ G21F 5/005; G21F 5/008; G21F 5/10
  (Continued)

(56) References Cited

U.S. PATENT DOCUMENTS 4,040,480 A    8/1977    Richards
4,377,509 A    3/1983    Haynes et al.
(Continued)

FOREIGN PATENT DOCUMENTS

FR    3017237 B1    8/2015
GB    2217680 A  * 11/1989  ........... B65D 21/022
(Continued)

OTHER PUBLICATIONS

International Search Report and the Written Opinion of International Searching Authority of PCT/US2022/29674 Issued Jan. 27, 2023.

*Primary Examiner* — Jack W Keith
*Assistant Examiner* — Jinney Kil
(74) *Attorney, Agent, or Firm* — The Belles Group, P.C.

(57) ABSTRACT

A passively cooled stackable nuclear waste storage system may include a pair of vertically stacked radiation-shielded nuclear waste storage casks. Each cask has a cavity which holds a nuclear waste canister containing spent nuclear fuel or other high-level radioactive wastes. The lower cask may be founded on an above-grade concrete pad. The upper cask is vertically stacked on and detachably coupled to the lower cask. The upper cask comprises a perforated baseplate which establishes fluid communication between cavities of both casks and is configured to prevent radiation shine. One or both casks may include air inlet vents configured to draw ambient ventilation air into each respective cask cavity for cooling the nuclear waste. In operation, air is drawn inward into each cask cavity independently. Air heated in the lower cask rises into the upper cask where it mixes with air drawn into the upper cask and is returned to atmosphere.

24 Claims, 28 Drawing Sheets

(58) Field of Classification Search
USPC ............ 250/506.1, 507.1; 376/272; 206/503, 206/508
See application file for complete search history.

(56) References Cited

U.S. PATENT DOCUMENTS

| | | | |
|---|---|---|---|
| 4,527,066 A | | 7/1985 | Dyck |
| 4,535,250 A | | 8/1985 | Fields |
| 4,861,194 A | | 8/1989 | Lang et al. |
| 5,753,925 A | | 5/1998 | Yamanaka et al. |
| 6,518,585 B1 | * | 2/2003 | Gluschke ................. G21F 5/00 250/506.1 |
| 6,718,000 B2 | | 4/2004 | Singh et al. |
| 7,786,456 B2 | | 8/2010 | Singh et al. |
| 8,995,604 B2 | | 3/2015 | Singh et al. |
| 9,117,556 B2 | | 8/2015 | Yamamoto |
| 9,852,822 B2 | | 12/2017 | Singh |
| 10,147,509 B2 | | 12/2018 | Singh |
| 10,446,287 B2 | | 10/2019 | Singh |
| 10,811,154 B2 | | 10/2020 | Singh et al. |
| 2003/0147486 A1 | | 8/2003 | Singh et al. |
| 2010/0258751 A1 | * | 10/2010 | Shayer ................... G21F 1/042 521/45.5 |
| 2011/0172484 A1 | | 7/2011 | Singh et al. |
| 2015/0357066 A1 | * | 12/2015 | Singh ................. B65D 21/0224 405/129.55 |
| 2018/0130566 A1 | | 5/2018 | Hida et al. |
| 2019/0103197 A1 | * | 4/2019 | Singh ....................... G21F 9/34 |
| 2020/0043619 A1 | | 2/2020 | Stengel |

FOREIGN PATENT DOCUMENTS

| | | | | |
|---|---|---|---|---|
| JP | 2000275394 A | * | 10/2000 | |
| JP | 2000275394 A2 | | 10/2000 | |
| JP | 2000275395 A | * | 10/2000 | |
| JP | 3876118 B2 | | 1/2007 | |
| JP | 2013050431 A1 | | 3/2013 | |

\* cited by examiner

STACKABLE NUCLEAR WASTE STORAGE SYSTEM

CROSS-REFERENCE TO RELATED APPLICATIONS

The present application claims the benefit of U.S. Provisional Application No. 63/189,383 filed May 17, 2021; which is incorporated herein by reference in its entirety.

BACKGROUND

The present invention relates generally to vertical ventilated modules or casks used for above-ground/grade dry storage of radioactive high level nuclear waste such as spent nuclear fuel (SNF) from nuclear power generating plants or other facilities comprising a nuclear reactor.

In the operation of nuclear reactors, the nuclear energy source is typically in the form of a plurality of hollow Zircaloy tubes each filled with enriched uranium pellets, which are collectively arranged in assemblages referred to as fuel assemblies. When the energy in the fuel assembly has been depleted to a certain predetermined level, the fuel assembly is removed from the nuclear reactor and referred to as used or spent nuclear fuel ("SNF"). The standard structure used to package or store the SNF assemblies discharged from light water reactors for off-site shipment or on-site dry storage is an all-welded hermetically-sealed stainless steel container. Such containers are well known and may be variously referred to as multi-purpose canisters (MPCs) such as those available from Holtec International of Camden, New Jersey, or other dry storage canisters (DSCs). The term "canister" is a term of art and understood to refer to this specific type of unshielded metallic vessel used to storage SNF assemblies or other high level nuclear waste materials.

Regardless of their name, these SNF canisters are characterized by a relatively thin-walled stainless shell to effectively transmit heat emitted by the decaying the SNF assemblies across the canister's wall boundary. The stainless steel shell has several full through-thickness continuous seam welds, including longitudinal seam welds and girth welds such as those that connect the shell to the top and bottom end closure plates. A fuel basket is typically arranged inside a metallic storage canister which defines an array of prismatic-shaped storage cells each of which is sized to hold a single fuel assembly, which in turn comprises a plurality of individual spent nuclear fuel rods.

A single heat-emitting canister is in turn stored and sealed inside its own outer vertical ventilated module (VVM) which may be referred to as a ventilated nuclear waste storage overpack or cask in the art. The casks comprise heavy radiation shielding generally having a body comprising concrete, and/or other radiation shielding materials encased between inner and outer shells of steel which block gamma and neutron radiation emitted from the SNF assemblies which passes through the canister shell and end plates. The ventilated casks are used for safe transport and/or storage of the multiple spent fuel assemblies within the inner fuel basket. In addition to emitting neutron and gamma radiation) requiring protective shielding, the highly radioactive SNF in the fuel assemblies or other high-level nuclear waste materials still produce considerable amounts of heat which must be dissipated from the MPC and storage cask to avoid damage to the fuel assemblies stored in the canister.

The concept of using consolidated interim storage (CIS) is intended to provide geographically distributed off-site storage facilities for spent nuclear fuel and other high level radioactive nuclear wastes gathered from a number of individual generating plant sites, thereby providing greater control over the widely dispersed waste stockpiles. Independent Spent Fuel Storage Installation (ISFSI) facilities are one such CIS used to site and house an array of nuclear waste storage casks. Regulatory requirements for siting and installing such facilities is a relatively time-consuming and expensive proposition. Generally, a single nuclear waste storage cask with single MPC therein occupies a dedicated space or spot on an ISFSI concrete slab or pad laid above grade. However, this practice does not make efficient use of available ISFSI storage space and results in such nuclear waste storage facilities quickly reaching maximum capacity.

Accordingly, improvements in nuclear waste storage practices and systems are needed.

BRIEF SUMMARY

This disclosure addresses the challenge of limited nuclear waste storage capacity at an ISFSI facility and overcomes the drawback of the past practices noted above. In one embodiment, a stackable nuclear waste storage system may comprise a pair of vertically stacked radiation-shielded nuclear waste storage casks. The bottom or lower cask is founded on and may be detachably coupled to a steel reinforced concrete pad. The pad may be located above grade in one non-limiting embodiment; however, the pad may also be used below grade in other possible implementations of the system. The top or upper cask is vertically stacked on and detachably coupled to the top of the lower cask. In one embodiment, the upper cask may be bolted to the lower cask via mating mounting flanges of each cask.

The present waste storage system advantageously leverages the extremely heavy and vertically stubby profile (e.g., height-to-diameter ratio about 1.5) of typical concrete and steel radiation shielded storage casks used to store nuclear waste canisters such as MPCs containerizing the SNF or high level nuclear waste materials. Such storage casks may be about 11.5 feet in diameter by about 17 feet tall. The height to diameter ratio allows the storage casks to be safety stacked vertically when detachably but fixedly coupled together cask-to-cask and deployed in the manner described herein. In addition, stackable nuclear waste storage system advantageously does not exceed the maximum lifting height limitations of conventional track-driven cask crawlers, thereby allowing use of such standard equipment for hoisting the upper cask on top of the lower cask for coupling.

Each cask comprises an internal cavity configured for holding nuclear waste. The waste may be spent nuclear fuel (SNF) assemblies in one embodiment contained inside a hermetically sealed metallic nuclear waste canister such as a multi-purpose canister (MPC) available from Holtec International of Camden, New Jersey, or other dry storage canister. Such canisters are known in the art and are unshielded from a radiation attenuation or blockage standpoint. That function is provided by the outer cask which comprises a thick body formed of radiation shielding material(s). In one embodiment, the internal cavities of the casks have a height and transverse cross-sectional area configured to hold no more than a single nuclear waste fuel canister each. The internal cavities of the CEC and cask may be in direct fluid communication internally within the stacked casks such that heat cooling air from the lower cask flows vertically directly upwards into the upper cask via natural convective thermo-siphon flow. The process or act of mounting the upper cask to the lower cask fluidly interconnects the two cavities of the casks.

Coupling the upper cask to lower cask establishes fluid communication between the nuclear waste storage cavities of the casks internally within the pair of stacked cask bodies. Whereas the lower cask includes a solid baseplate on its bottom end which is configured for seating and detachable mounting to an above-grade concrete pad such as via bolting, the baseplate on the bottom of the upper cask conversely is perforated comprising a plurality axial through holes which allow heated air from the cavity of the lower cask to flow upwards into the cavity of upper cask.

At least the lower cask of the pair includes a plurality of ventilation air inlet vents or ducts configured to draw in ambient air for cooling the canisters inside both upper and lower casks radially inwards into the internal cavity of the lower cask first. In certain preferred but non-limiting embodiments, the upper cask may also include ventilation air inlet ducts to separately draw ambient air into its internal cavity independently of the air inlet ducts of the lower cask. This secondary ventilation air provides additional cooling capacity and is mixed with the already heated ventilation air rising into the upper cask from the lower cask.

The ventilation air system for the fluidly interconnected stacked cask assembly operates via natural convective thermo-siphon flow driven by the decay heat emitted from the canisters inside the casks emanating from the SNF (or other high level nuclear waste) stored in the canisters located inside the lower and upper casks. The ventilation air system thus passively cools the nuclear waste without requiring the assistance of blowers or fans. The heated ventilation air is returned to the environment via the top closure lid on the upper cask, as further described herein.

In one aspect, a passively ventilated nuclear waste storage system comprises: a lower cask comprising: a first internal cavity extending along a first cavity axis and configured for holding a first nuclear waste canister; at least one first air inlet duct configured to draw cooling air into a bottom portion of the first internal cavity of the lower cask; an upper cask comprising: a second internal cavity extending along a second cavity axis and configured for holding a second nuclear waste canister; at least one outlet duct configured to allow heated air in a top portion of the second internal cavity to exit the second internal cavity of the upper cask; the upper cask stacked atop the lower cask in a vertically stacked arrangement so that a cask-to-cask interface is formed between the upper and lower casks; wherein the first and second internal cavities are fluidly interconnected so that heated air in a top portion of the first internal cavity can flow into a bottom portion of the second internal cavity.

In another aspect, a passively ventilated nuclear waste storage system comprises: a lower cask comprising a first internal cavity extending along a first cavity axis and configured for holding a first nuclear waste canister; an upper cask comprising a second internal cavity extending along a second cavity axis and configured for holding a second nuclear waste canister; the upper cask stacked atop the lower cask in a vertically stacked arrangement so that a cask-to-cask interface is formed between the upper and lower casks; and a bottom end of the upper cask coupled to a top end of the lower cask; wherein the first and second internal cavities are fluidly interconnected.

In another aspect, a method for forming a passively cooled nuclear waste system comprises: positioning a lower cask on an above grade concrete pad, the lower cask including a body comprising a first cavity; inserting a first canister containing nuclear waste emitting thermal energy in the first cavity of the lower cask; positioning an upper cask on the concrete pad, the upper cask including a body comprising a second cavity; inserting a second canister containing nuclear waste emitting thermal energy in the second cavity of the upper cask; positioning the upper cask on top of the lower cask, the second cavity being placed in fluid communication with the first cavity of the lower cask; and detachably coupling the upper cask to the lower cask in vertically stacked relationship. The method may further include: detachably coupling a closure lid on a top end of the upper cask after inserting the second canister therein; heating the ventilation air in the first cavity; flowing the heated ventilation air upwards into the second cavity of the upper cask; drawing ambient ventilation air into the second cavity of the upper cask through a plurality of second air inlet ducts; mixing the heated ventilation air with the ventilation air drawn into the second cavity of the upper cask; further heating the mixed ventilation air in the second cavity; and discharging the further heated ventilation air to ambient atmosphere via the closure lid on the upper cask.

In another aspect, a method for adding storage capacity to an existing nuclear waste storage system comprises: positioning a lower cask on an above grade concrete pad at a first point in time, the lower cask including a body comprising a first cavity and plurality of radial first air inlet ducts in fluid communication with the first cavity; inserting a first canister containing nuclear waste emitting thermal energy in the first cavity of the lower cask; detachably coupling a first closure lid on top of the lower cask, the first closure lid defining at least one air outlet duct in fluid communication with the second cavity of the lower cask; removing the first closure lid from the lower cask at a second point in time later than the first point in time; positioning an upper cask on the concrete pad, the upper cask including a body comprising a second cavity and plurality of radial second air inlet ducts in fluid communication with the second cavity; inserting a second canister containing nuclear waste emitting thermal energy in the second cavity of the upper cask; lifting and positioning the upper cask on top of the lower cask; establishing fluid communication between the first and second cavities of the lower and upper casks, respectively; and detachably coupling the upper cask to the lower cask in vertically stacked relationship.

BRIEF DESCRIPTION OF THE DRAWINGS

The present invention will become more fully understood from the detailed description and the accompanying drawings, wherein like elements are labeled similarly and in which.

Figure 1A:
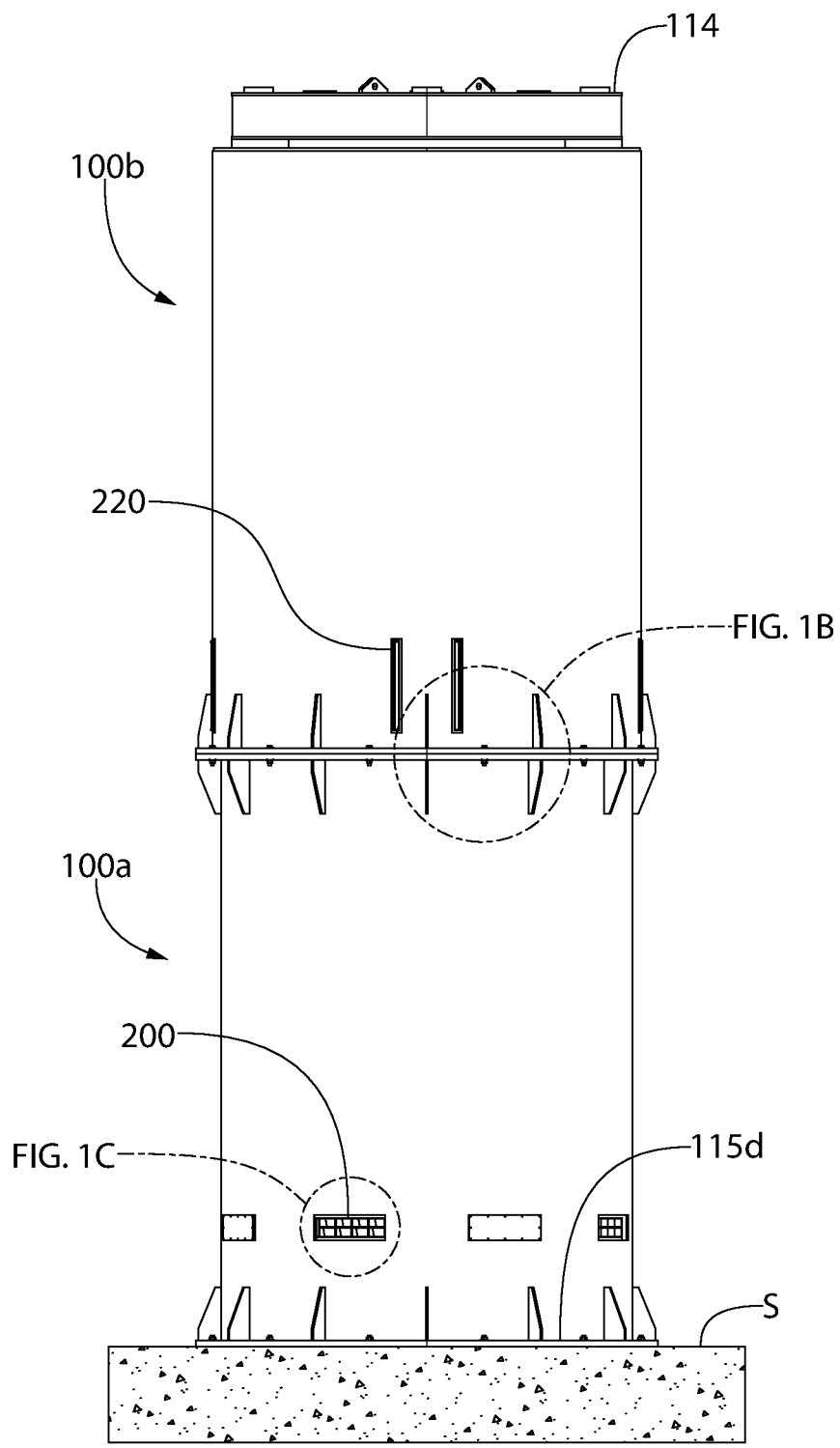
FIG. 1A is a side view of a stackable nuclear waste storage system for storing high level nuclear radioactive waste material including a lower cask and upper cask assembly mounted on a horizontal support surface.
Figure 1B:
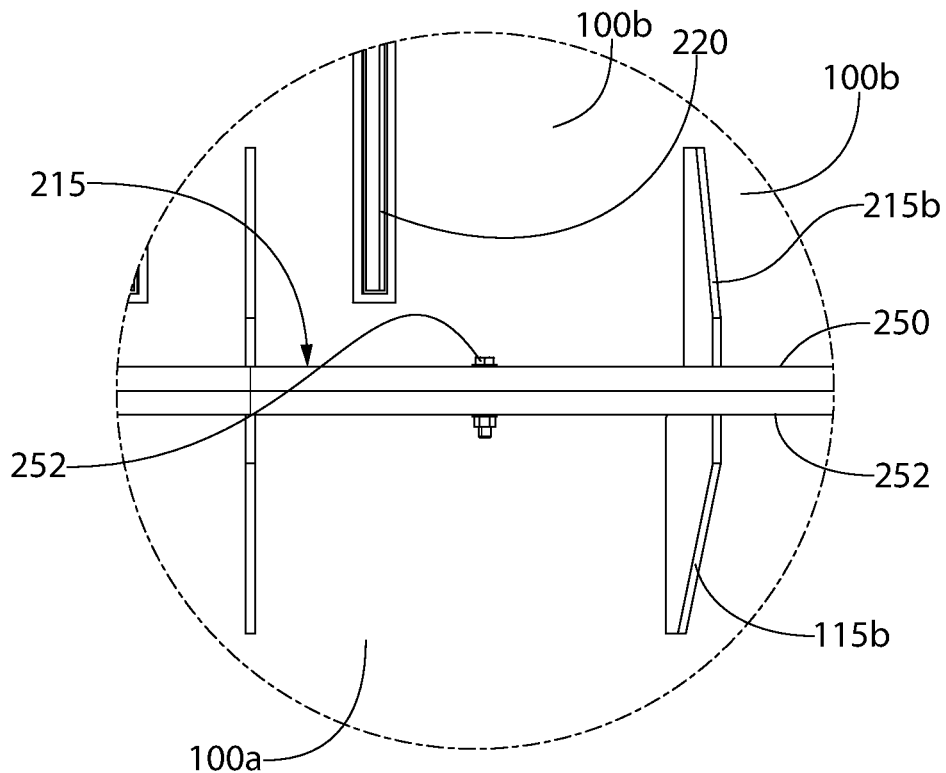
FIG. 1B is a detail taken from FIG. 1A.
Figure 1C:
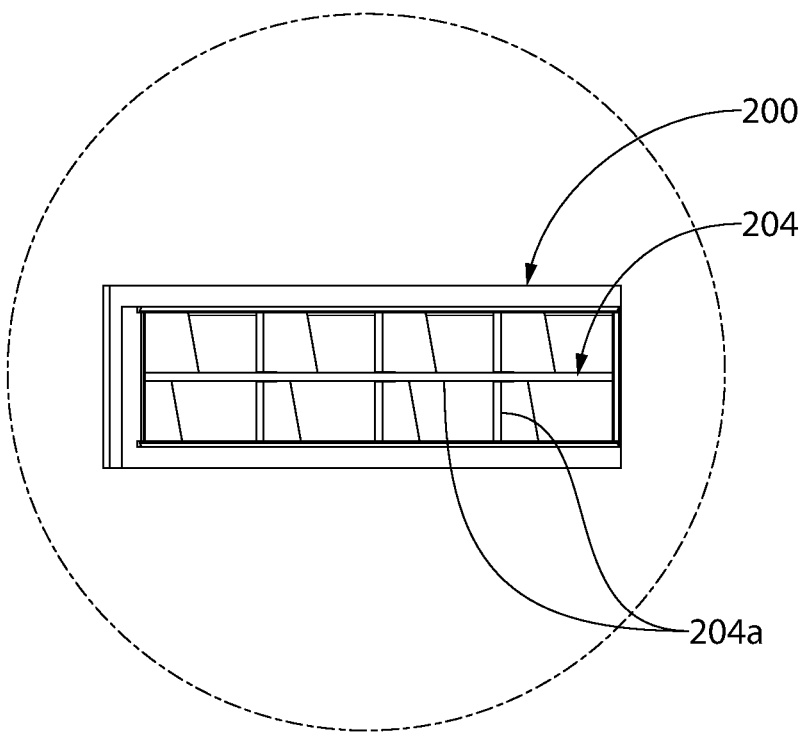
FIG. 1C is a detail taken from FIG. 1B.
Figure 2:
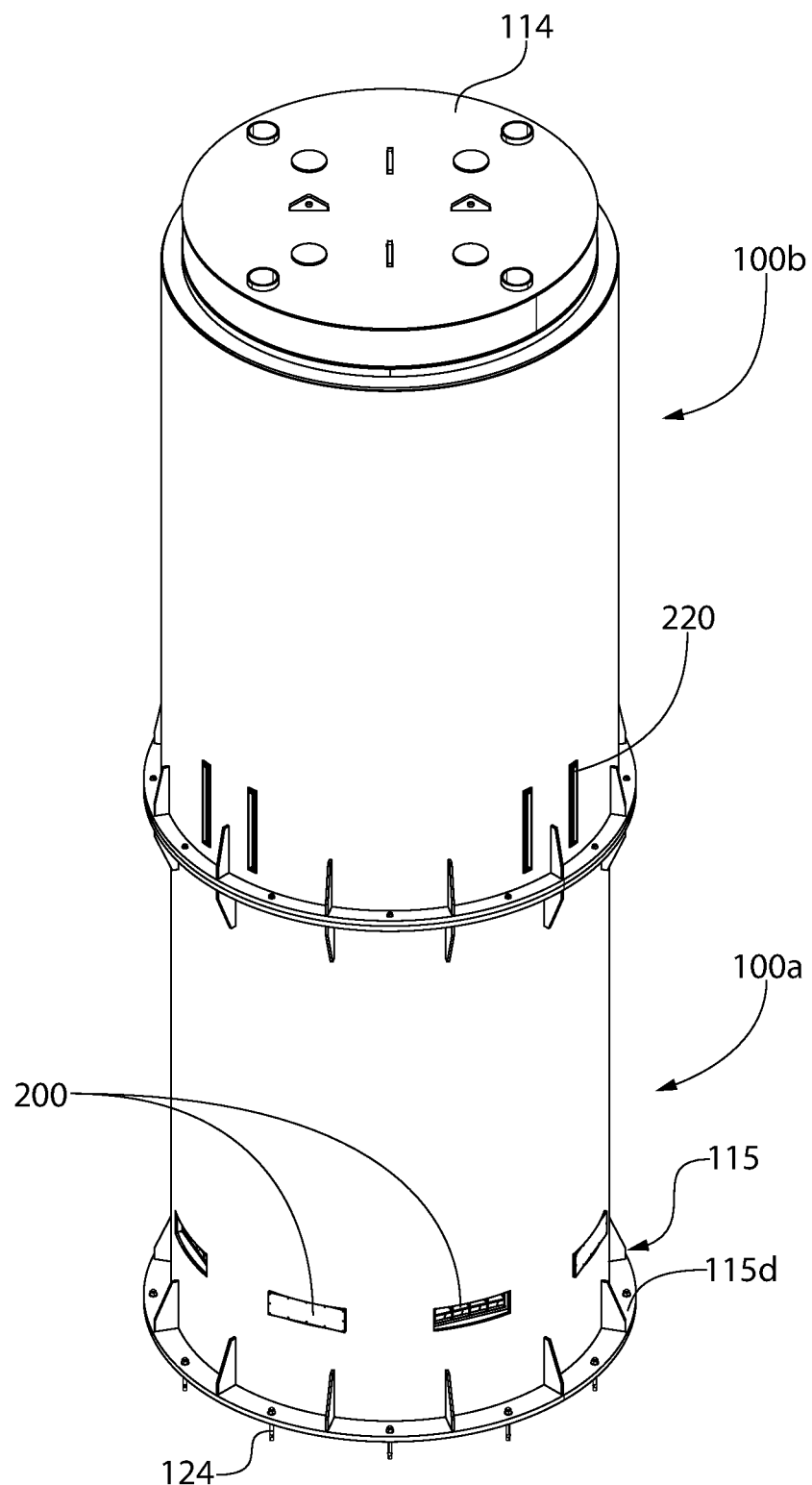
FIG. 2 is a top perspective of the cask assembly of FIG. 1A.
Figure 3:
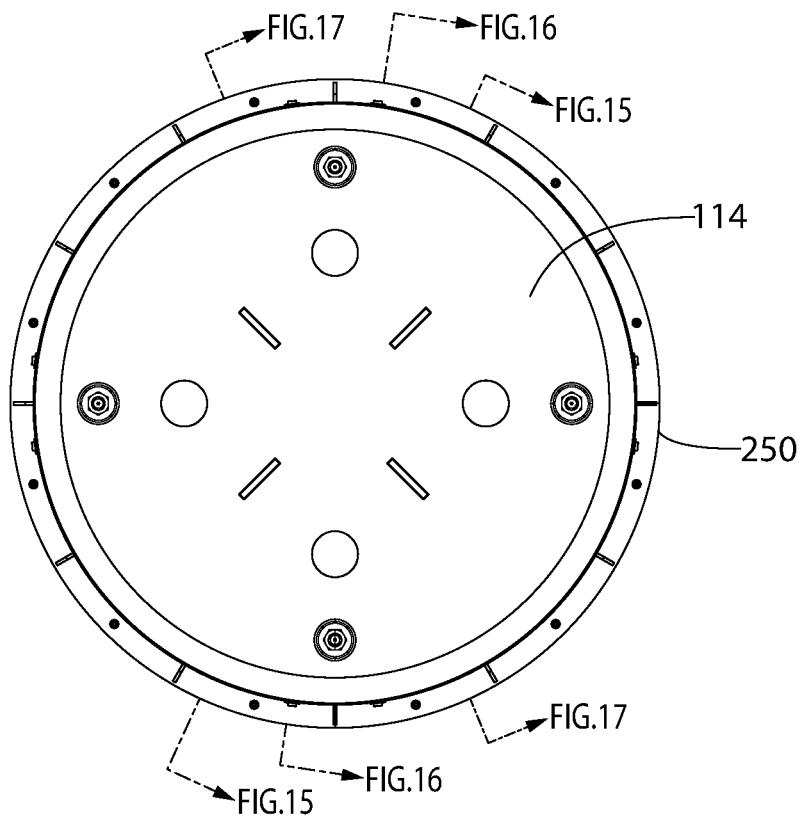
FIG. 3 is a top view thereof.
Figure 4:
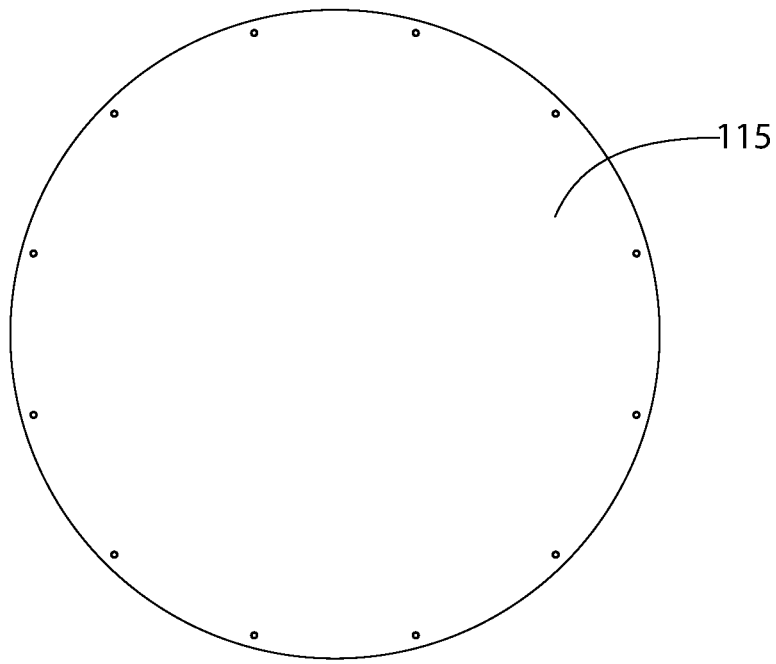
FIG. 4 is a bottom view thereof.
Figure 5:
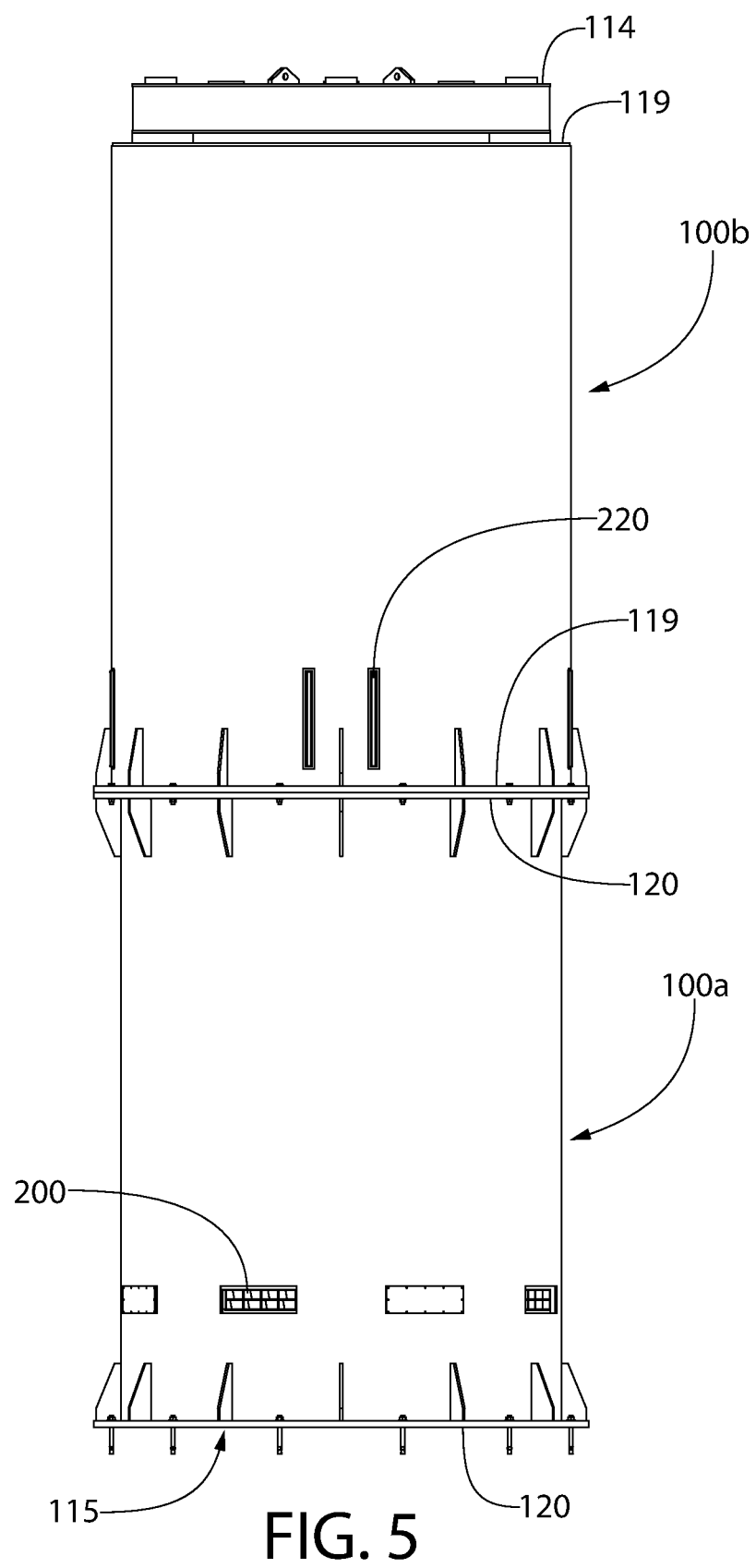
FIG. 5 is a first side view thereof.

All drawings are schematic and not necessarily to scale. Features shown numbered in certain figures are the same features which may appear un-numbered in other figures unless noted otherwise herein. A reference to a figure by a whole number herein which may include several figures with the same number but with different alphabetical suffixes may be considered a reference to all of those figures unless specifically noted otherwise.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

FIGS. 1-29 depict various aspects of a stackable nuclear waste storage system generally comprising a pair of passively cooled and naturally ventilated outer storage modules or casks according to the present disclosure. The system includes a lower cask 100a and upper cask 100b configured for detachably coupling to the lower cask in vertically stacked relationship. The stacked casks are concentrically arranged with respect to one another along a common vertical centerline axis.

Features of the lower and upper casks 100a, 100b and nuclear waste storage system will now be described in further detail. The casks may be essentially the same in construction for the most part. Accordingly, it will be appreciated that descriptions of cask structural or other features which follow will be applicable to both casks unless noted otherwise. Differences in structural or other features which may be unique for either the lower or upper casks will be explicitly pointed out.

Lower and upper casks 100a, 100b are constructed for above grade placement such as on a top surface of a support structure such as concrete slab or pad S, which may be a top pad of an ISFSI facility as described above. The casks are each configured to hold a single hermetically sealed metallic nuclear waste canister 101 such as a multi-purpose canister (MPC) available from Holtec International of Camden, New Jersey, or other sealed dry storage canister.

Canister 101 is a vertically elongated and hermetically seal-welded (i.e. gas tight) vessel in one embodiment comprising cylindrical shell 103, bottom closure plate 104a affixed to a bottom end of the shell, and a top closure plate 104b coupled to a top end of the shell. The canister shell may be formed by one or more hermetically seal welded rolled metal plate segment. The construction of the canister does not limit the present invention in any regard. An interior cavity 105 is defined within the shell which is configured for holding the nuclear waste 106 (represented schematically in the cross-sectional figures by cross-hatching), which may include SNF fuel assemblies or other high level radioactive waste. The canister (shell, top closure plate, and bottom closure plate) preferably may be made of stainless steel in one embodiment for corrosion protection.

Each of the lower and upper casks 100a, 100b may be similarly constructed and are heavily radiation-shielded double-walled vessels. The casks in one embodiment including a vertically orientated and elongated cask body 110. Each cask body is similarly formed by a cylindrical outer shell 111 and inner shell 112, and radiation shielding material 113 disposed in an annular space formed therebetween. The shells 111, 112 and shielding material 113 collectively define a cylindrical vertical sidewall 118 of the casks 100a, 100b having the foregoing composite construction of different materials. The inner and outer shells are concentrically arranged relative to each other as shown.

In one embodiment, the shielding material 113 may comprise a concrete mass or liner for neutron and gamma radiation blocking. A concrete aggregate comprising hematite or another type iron ore preferably may be used. This advantageously maximizes conductive heat transfer through the sidewalls 118 of the cask body to help dissipate and transmit a portion of the thermal energy (e.g., heat) emitted by the SNF (or other radioactive waste) stored inside the casks within the canister. The passive ventilation air system described herein dissipates the remainder of the decay heat to protect the structural integrity of the canister and SNF assemblies stored therein. Other radiation shielding materials may be used in addition to or instead of concrete including lead for gamma radiation shielding, boron containing materials for neutron blocking (e.g. Metamic® or others), steel, and/or others shielding material typically used for such purposes in the art.

Inner shell 112 of the casks 100a, 100b defines an inner or internal surface 112a and outer shell 111 defines an outer or external surface 111a of the casks. Surfaces 111a, 112a formed by the cylindrical shells 111, 112 may correspondingly be cylindrical and arcuately curved in one embodiment. The casks each further include a top end 119 defined by the upper end of the cask body 110 and bottom end 120 defined by the lower end.

The passively ventilated and cooled storage casks 100a, 100b may be both vertically elongated and oriented as shown in the illustrated embodiment. The inner and outer shells 112, 111 may be formed of a suitable metallic material, such as without limitation steel (e.g. carbon or stainless steel). If carbon steel is used at least the external surface 111a of the cask may be epoxy painted/coated for corrosion protection. The metal shells 111, 112 may each have representative thickness of about ¾ inches as one non-limiting example; however, other suitable thicknesses may be used.

Figure 15:
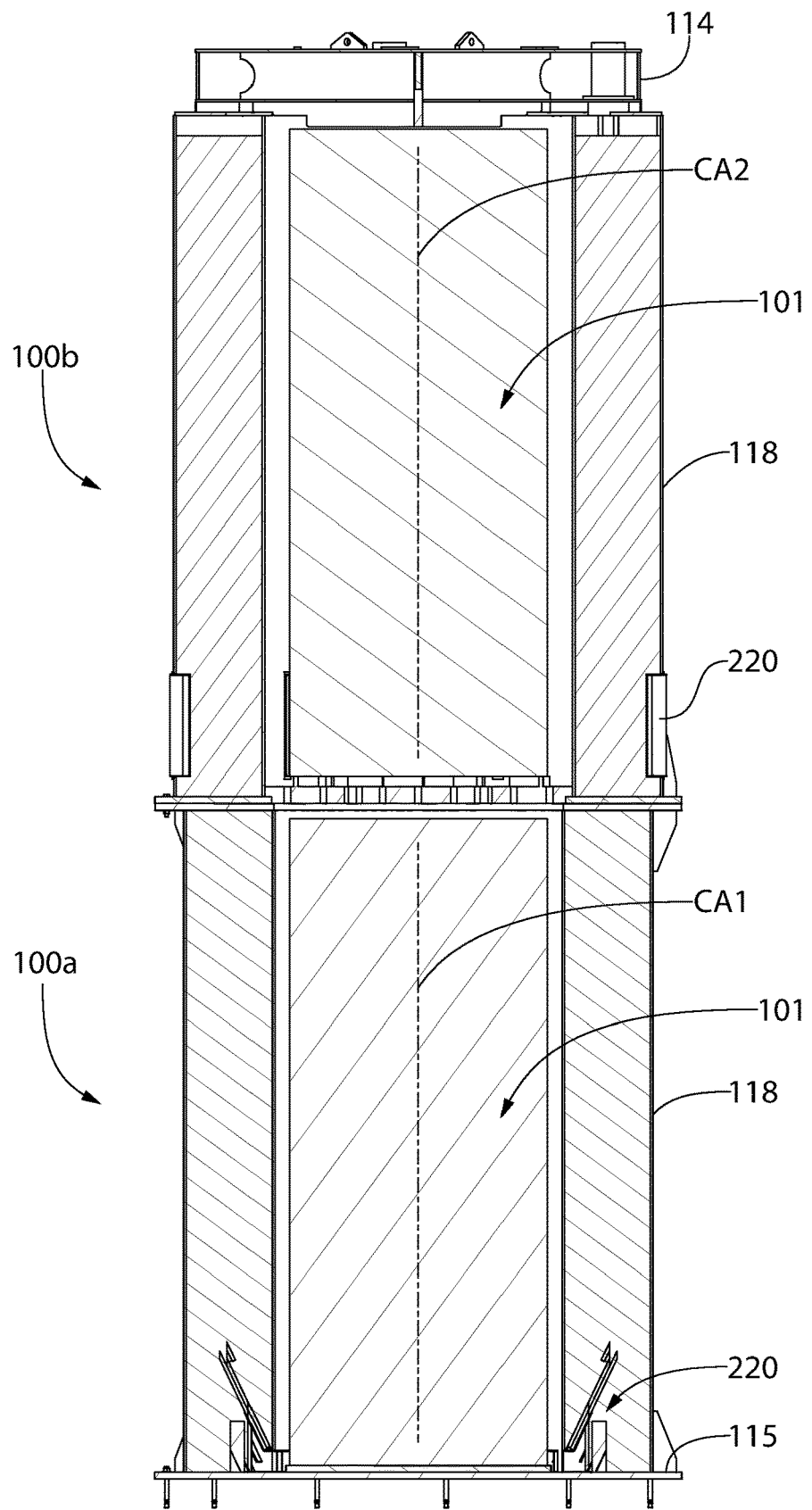
FIG. 15 is a second side vertical cross sectional view thereof.
Figure 16:
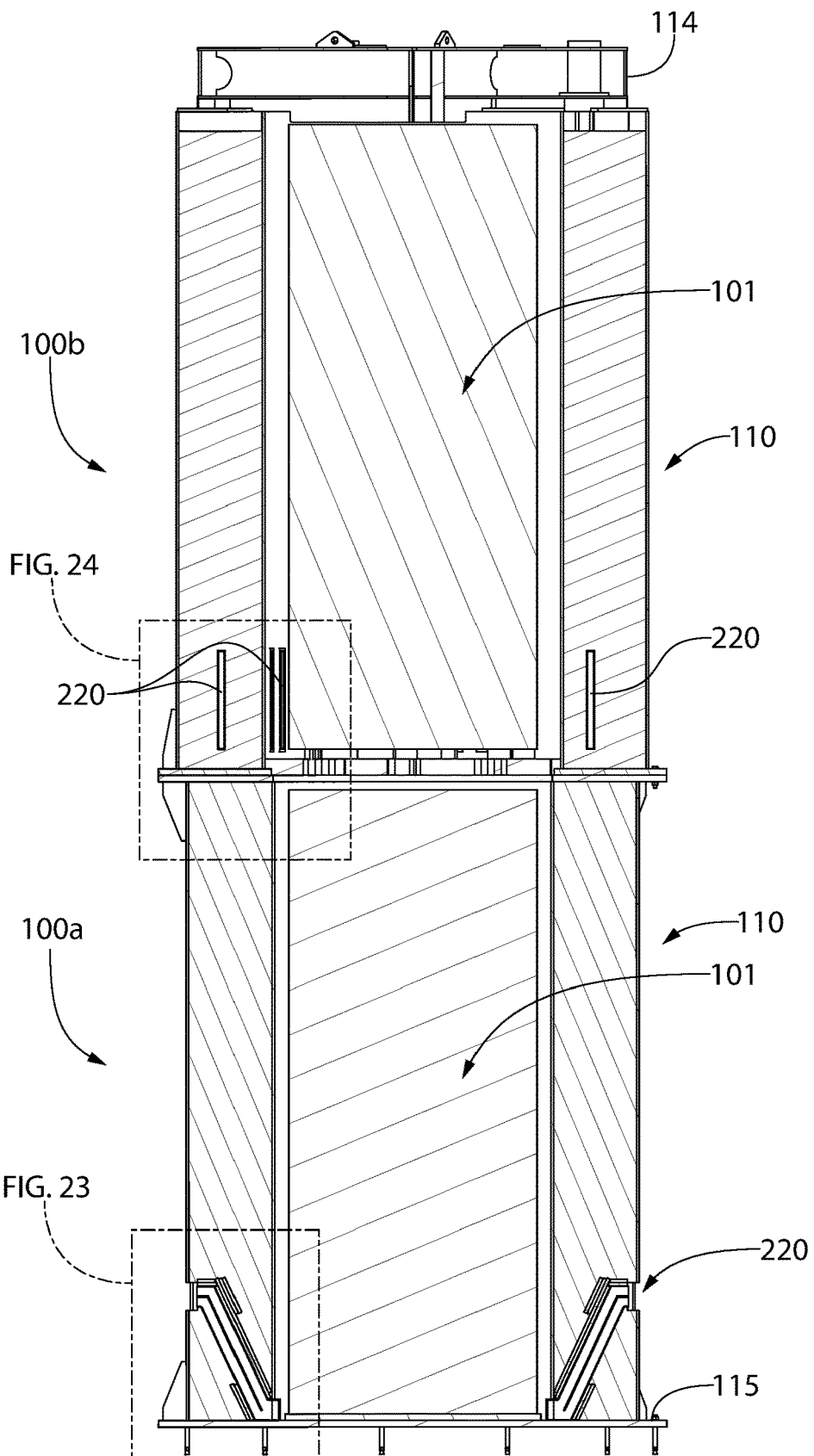
FIG. 16 is a third side vertical cross sectional view thereof.

Each of the upper and lower casks 100a, 100b comprises a vertically-extending internal cavity 121 which extends along a respective vertical cavity axis CA1, CA2 which collectively defines a common vertical centerline axis of the cask assembly (see, e.g., FIG. 15). Each cavity 121 extends vertically for substantially the entire height of the cask. Cavity 121 may be of cylindrical configuration in one embodiment with a circular cross-sectional shape to conform to the cylindrical shape of the nuclear waste canister 101; however, other shaped cavities with corresponding cross-sectional shapes may be used including polygonal shapes and other non-polygonal shapes (e.g. rectilinear, hexagon, octagonal, etc.) depending on configuration of the nuclear waste container stored therein. The cavities of upper and lower casks 100a, 100b may each have a height and transverse cross-sectional area configured to hold only a single nuclear waste canister 101 loaded with SNF assemblies (not shown) or other high level radioactive waste emitting radiation and substantial amounts of thermal energy in the form of decay heat.

Each cask 100a, 100b comprises a bottom baseplate, albeit of slightly different construction. Lower cask 100a comprises a solid metal baseplate 115 may be seal welded to the inner and outer shells 112, 111 at the bottom end 120 of the cask to fluidly seal cavity 121 at bottom and prevent the ingress of water. Structurally, this forms a rigid self-supporting cask assemblage or structure which can be fabricated in the shop, and then transported to the desired nuclear waste storage site (e.g., nuclear generating plant and/or ISFSI) where it can be moved and handled by suitable lifting equipment such as track-driven cask crawlers (used and are well known in the art). The cask crawlers are also used for loading the nuclear waste canisters into the casks. Baseplate 115 may have a flat and circular in one non-limiting configuration as shown. Baseplate 115 may be structurally reinforced and stiffened by a plurality of circumferentially spaced apart angled gusset plates 115b welded to the peripheral portion 115c of the baseplate which projects radially outward beyond outer shell 111 and the lower portion of external surface 111a of outer shell 111 as shown. Peripheral portion 115c defines a user-accessible lower mounting flange 115d for anchoring the lower cask 100a to the concrete pad.

Baseplate 115 is configured for placement and seating on a top surface of a substantially flat horizontal support structure to rigidly and detachably anchor the lower cask 100a thereto. This laterally stabilizes the stacked cask assemblage to withstand vibrational forces and moments imposed by a seismic event. In one embodiment, the support structure may be an above-grade concrete pad S, such as the top pad of an ISFSI facility. A plurality of circumferentially spaced apart threaded mounting fasteners 124 such as anchor bolts may embedded in concrete pad S and arranged in a bolt circle may be used to fixedly anchor the peripheral mounting flange 115d defined by baseplate 115 of lower cask 100a in place such as via threaded nuts. Other forms of mounting the baseplate to the concrete pad may be used.

Baseplate 115 may be made of a similar metallic material as the shells 111, 112 (e.g., steel or stainless steel). In one embodiment, baseplate 115 may be about 3 inches thick as one non-limiting example and is supported by concrete top pad S. The baseplate supports the weight of lower cask 100a and the nuclear waste canister 101 stored therein, and in addition the weight of upper cask 100b and the canister stored therein. The bottom surface of baseplate 115 may be considered to define the bottom end 120 of the cask 100 for convenience of description purposes.

In one embodiment, a cylindrical support pedestal 116 may be rigidly affixed such as via welding to the top surface of baseplate 115 inside cavity 121 of lower cask 100a. Pedestal 116 is configured to support and elevate the canister 101 above the baseplate.

Upper cask 100b comprises a circular baseplate 215 at bottom formed of steel. Baseplate 215 comprises peripheral portion 215c which projects radially outward beyond outer shell 111. The baseplate 215 may be structurally reinforced and stiffened by a plurality of circumferentially spaced apart angled gusset plates 215b welded to the peripheral portion and the lower portion of the external surface 111a of outer shell 111 of upper cask 100b as shown. These aspects are generally similar to baseplate 115 of lower cask 100a previously described herein.

By contrast, however, the baseplate 215 of upper cask 100b is a perforated baseplate comprising a plurality of perforations in the form of axial through holes 215a. The through holes may have a circular cross-sectional shape in one embodiment; however, other suitably shaped through holes in cross section such as polygonal (e.g., square, rectangular etc.) and non-polygonal shapes may be used. The through holes 215a are vertically elongated and may be oriented parallel to each other and vertical cavity axis CA2 of the upper cask cavity 121. Preferably, only the central portion of the perforated baseplate 215 which resides inside the internal cavity 121 of the upper cask 100b includes the perforations (through holes 215a).

Baseplate 215 of upper cask 100b is structured to support the entire weight of the nuclear waste canister 101 stored in the upper cask. Unlike baseplate 115 of the lower cask 100a which serves structural purposes alone, the perforated baseplate 215 of upper cask 100b provides a structural purpose and in addition functions as an integral part of the cask ventilation air system as described above which removes decay heat (thermal energy) emitted by the nuclear waste canisters 101. The through holes 215a of perforated baseplate 215 places the cavity 121 of lower cask 100a in fluid communication with the cavity 121 of upper cask 100b. The fluid communication is established by the act of coupling the upper cask on top of the lower cask, which in effect forms a common fluidly interconnected and contiguous ventilation riser extending in a vertical direction internally through the stack of casks. Because the top end of the lower cask 100a and its cavity 121 are upwardly open, the perforated baseplate forms the only physical barrier between the cavities of the lower and upper casks 100a, 100b. The through holes 215a in perforated baseplate 215 defines an air transmissible barrier or structure which permits ventilation air in the cavity 121 of lower cask 100a to be passed and flow upwards into the cavity 121 of upper cask 100b. Operation of the ventilation system will be further described herein.

Perforated baseplate 215 of upper cask 100b further plays an important role in preventing radiation streaming or shine therethrough during the process of mounting the upper cask to lower cask 100a. After a nuclear waste canister 101 is loaded into cavity 121 of upper cask 100b while positioned on the concrete top pad S (as further described herein), the upper cask must be lifted off of the pad by a commercially-available cask crawler to position the cask on top of the lower cask already seated elsewhere on the pad. While the upper cask is suspended in mid air, the potential for radiation streaming or shine from the nuclear waste inside the cask cavity through the perforated baseplate to the ambient environment is created. To combat this issue, the axial through holes 215a in baseplate 215 therefore have a profile with a height to diameter ratio of at least 2:1, and preferably more than 3:1. The baseplate 215 therefore is a vertically thick metallic structure which may be about 6 inches thick or more for this purpose in some non-limiting embodiments. The vertically elongated through holes 215a act to scatter the radiation to prevent radiation streaming to the environment through the baseplate. To further enhance radiation scattering effectiveness of the elongated through holes, some or all of the through holes may be obliquely oriented to the cavity axis CA2 of the upper cask 100b instead of being parallel thereto.

In some embodiments, a plurality of spacer plates 215d may be rigidly attached (e.g., welded) to a top surface of the perforated baseplate 215 inside cavity 121. The spacer plates may be distributed over and spaced apart across the baseplate. Any suitably shaped structural steel plates may be used to construct the spacer plates. The spacer plates 215d are configured to engage and elevate a bottom of the nuclear waste canister 101 above the perforated baseplate. This advantageously allows ventilation air to circulate and flow beneath the canister to enhance cooling the nuclear waste therein. Spacer plates 315d may be about 6 inches high in some embodiments and are arranged in a plurality of orientations to each other to create radiation scattering which further prevent radiation streaming or shine through the perforated baseplate 315.

The internal cavities 121 of both the lower and upper casks 100a, 100b each have a height and transverse cross-sectional are configured for holding no more than a nuclear waste canister 101 therein, as previously described herein. The diameter of each cavity 121 (e.g., D1, D2) is intentionally larger than the outer diameter of the fuel canister 101 by an amount (e.g., less than ⅓ the diameter of the canister) to form a respective ventilation annulus 122 between the canister 101 and inner shell 112 within the internal cavity 121 of the cask (see, e.g. FIG. 14). The radial width W1 of annulus 122 in lower cask 100a and width W2 of annulus 122 in upper cask 100b are each preferably sufficient to draw heat generated by the nuclear waste within each canister 101 away from the canister as the cooling ventilation air flows upwards alongside the outer surface of the canisters as it is heated via a natural convective thermo-siphon effect. A typical ventilation annulus 122 may be in the range of about and including 2-6 inches in width as a non-limiting example depending on the estimated heat load of the fuel canister 100. The annulus 122 is defined by and extends vertically for the full height of the canister which may terminate at top proximate to the top ends of the casks. Accordingly the canister 101 has a height approaching the full height of the cask cavity 121, and at least greater than ¾th the height of the cavity. This lower portions of ventilation annulus 122 in each of the lower and upper casks 100a, 100b are placed in fluid communication with ambient atmosphere via the air inlet ducts extending through the sidewalls 118 of each of the casks, as further described herein.

In one embodiment, the radial width W2 of ventilation annulus 122 in upper cask 100b is preferably larger than radial width W1 of the ventilation annulus 122 in lower cask 100a. Because the nuclear waste canisters 101 stored in each cask have the same diameter which is standardized, the larger radial width W2 of the upper cask is the result of the cavity 121 of the upper cask having a larger diameter D2 than the diameter D1 of cavity 121 in the lower cask (see, e.g., FIG. 14). The additional annulus volume thus created in the cavity 121 of upper cask 100b can advantageously accommodate the additional volume of heated ventilation air received from the lower cask 100a without compromising the ability of the upper annulus to absorb the additional heat generated by the canister 101 in the upper cask. By contrast, the lower cask 100a may have a smaller diameter D1 cavity 122 since it only draws the volume of ambient cooling air inwards through its air inlet ducts 200 necessary to accommodate the heat load created by a single nuclear waste canister 101 inside.

Figure 7:
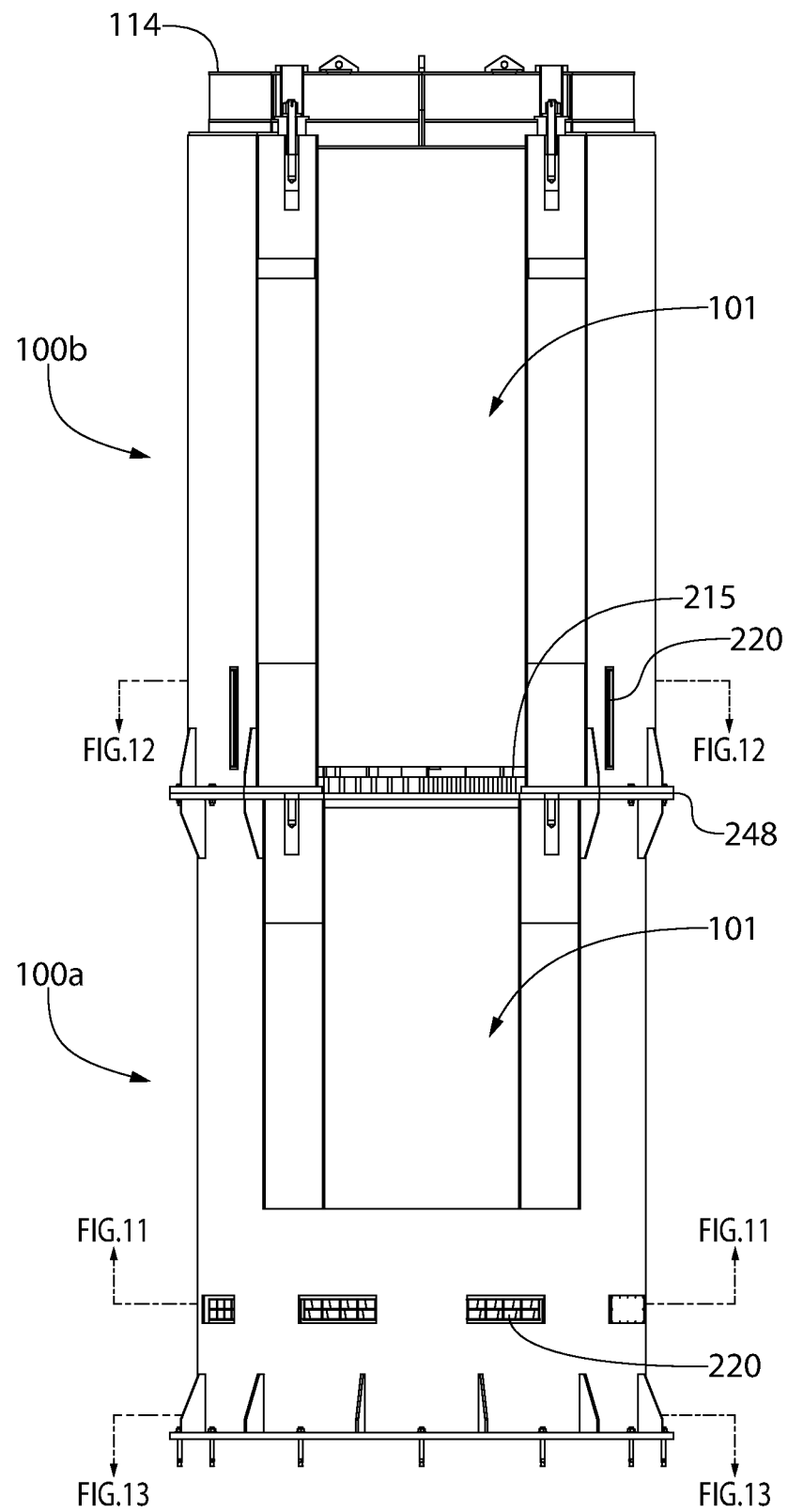
FIG. 7 is a third side view thereof with cutaway.
Figure 8:
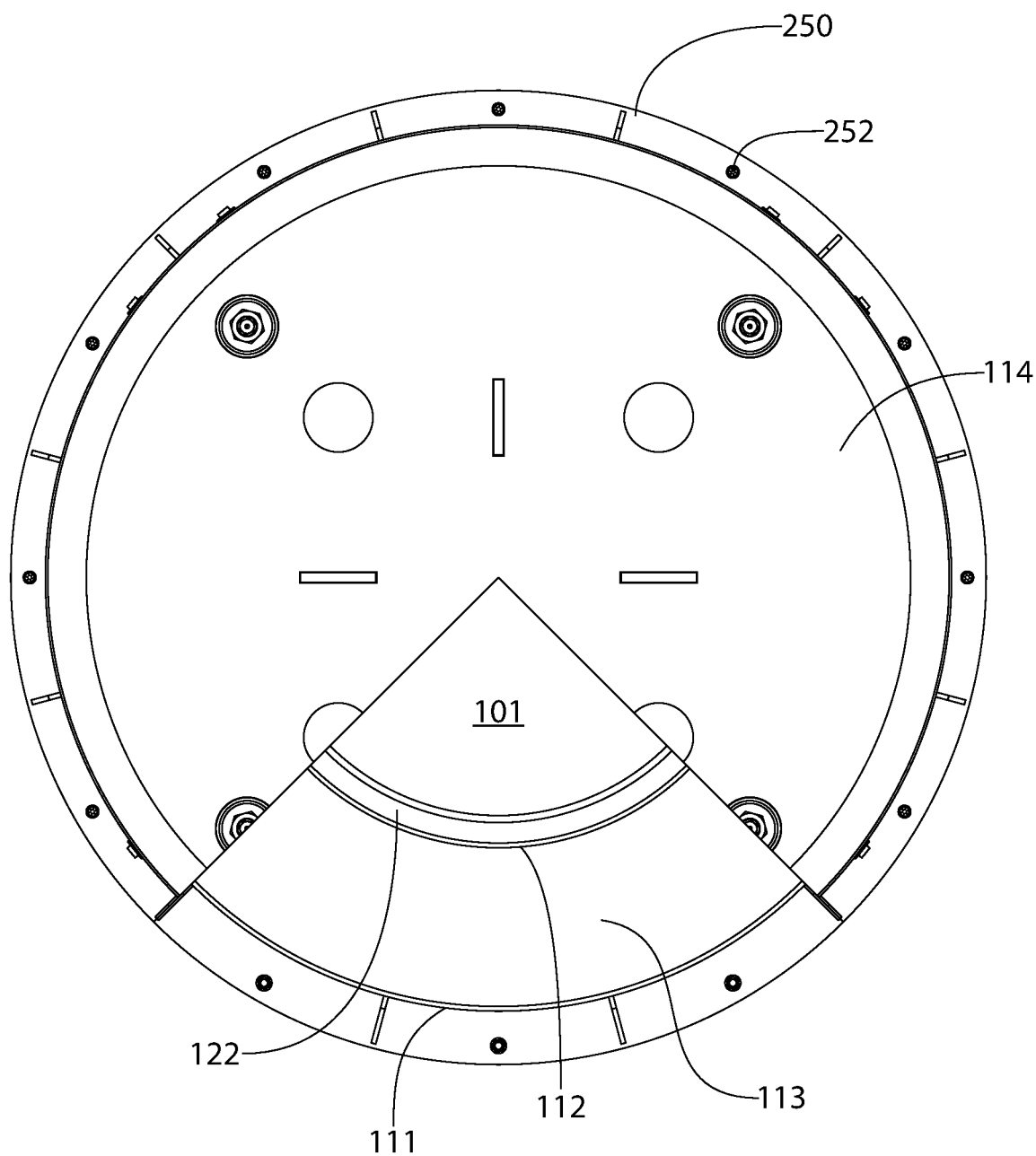
FIG. 8 is a top view of the cask assembly of FIG. 7.
Figure 9:
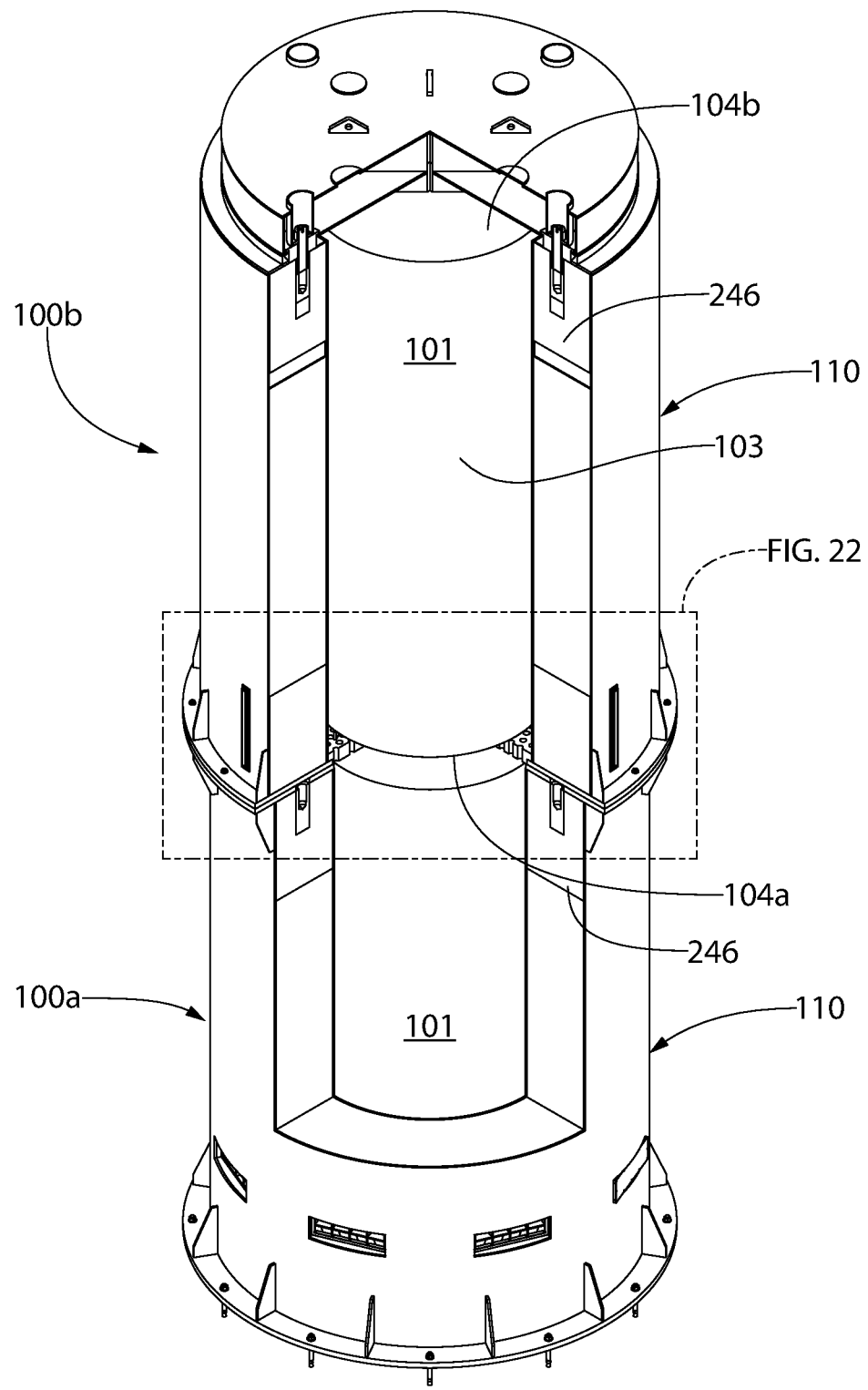
FIG. 9 is a first top perspective view of the cask assembly of FIG. 7 with cutaway.
Figure 10:
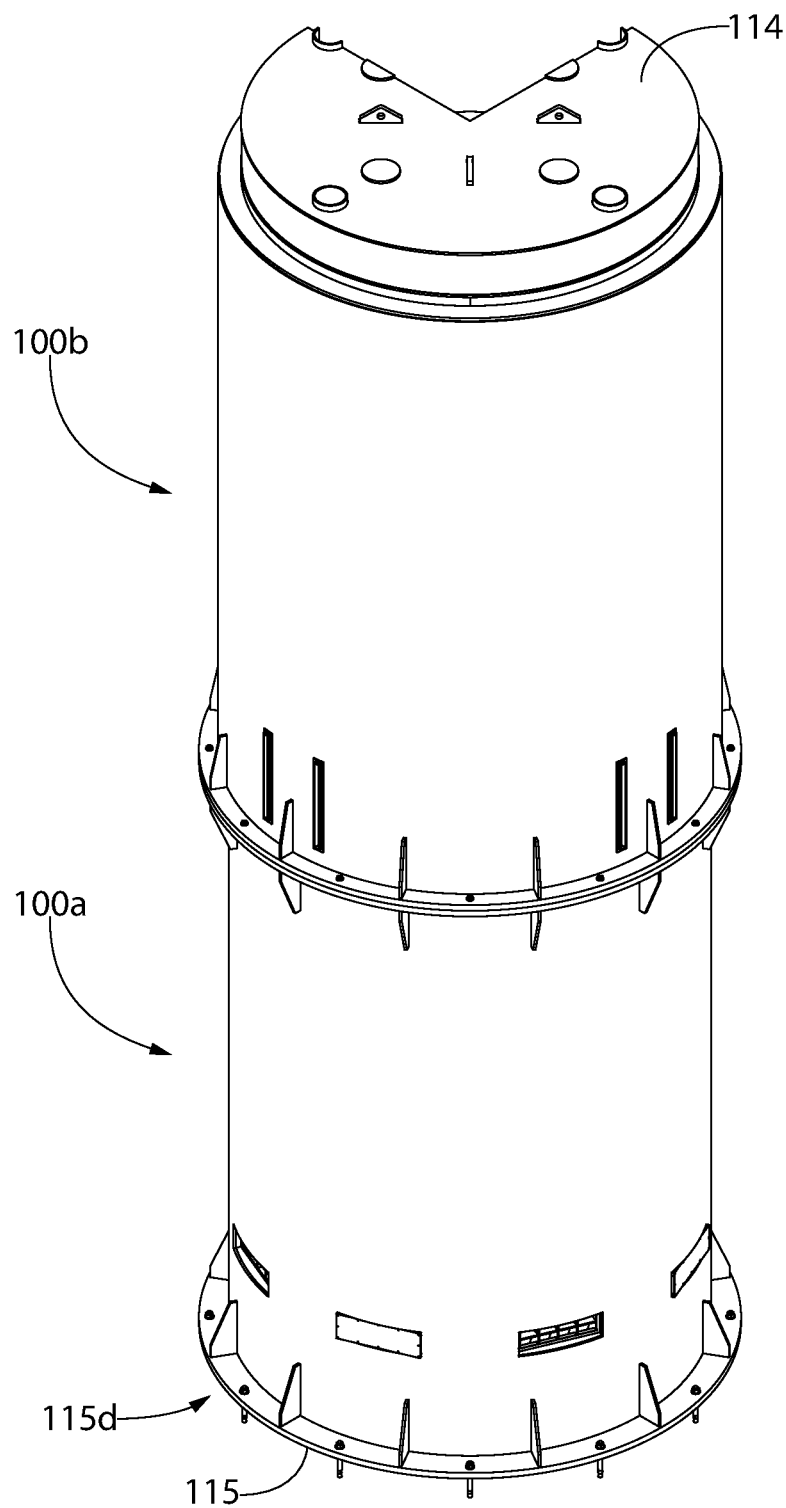
FIG. 10 is a second top perspective view thereof.
Figure 11:
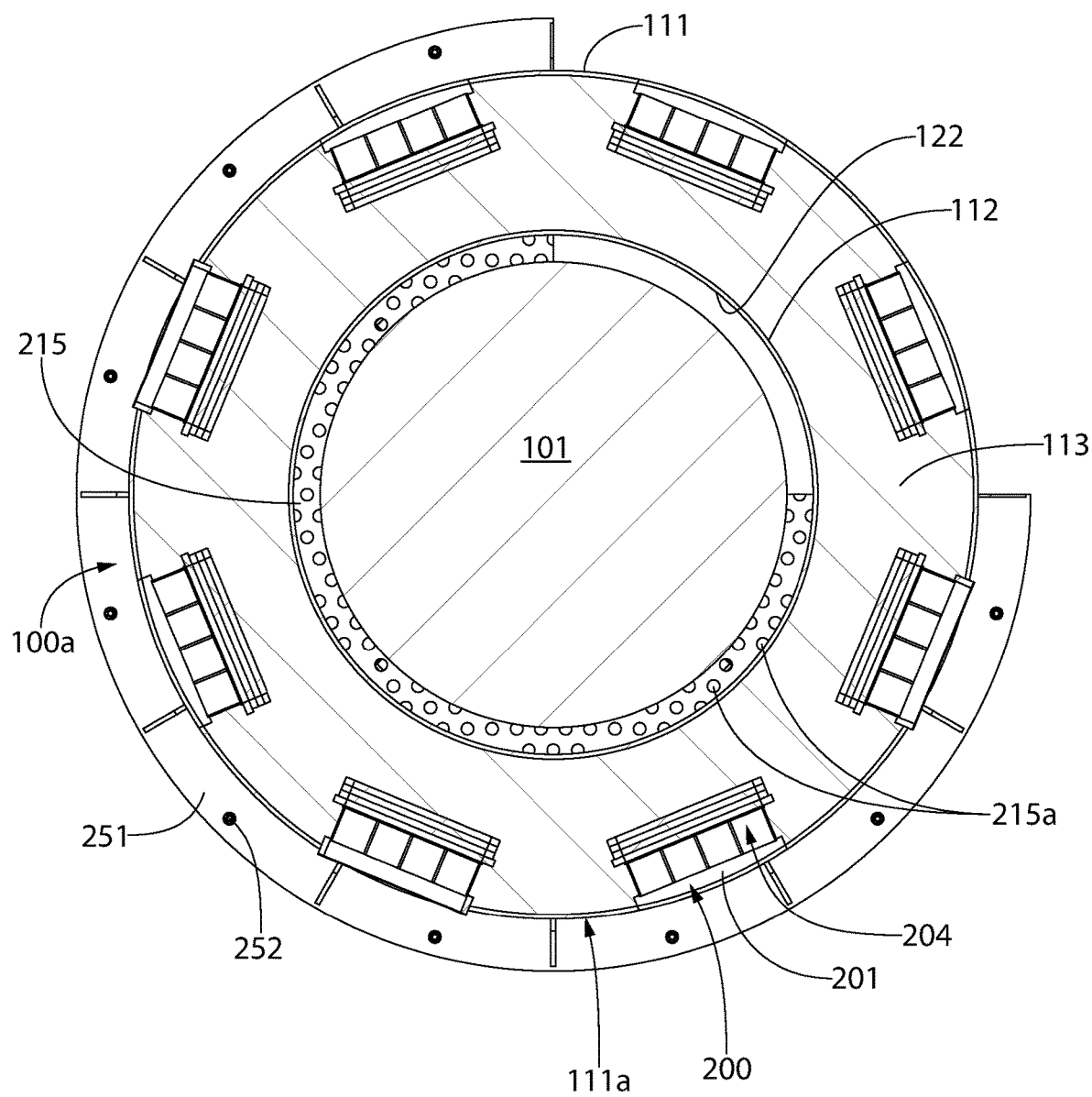
FIG. 11 is a first transverse cross sectional view taken from FIG. 7 showing the ventilation air inlet ducts of the lower cask.
Figure 12:
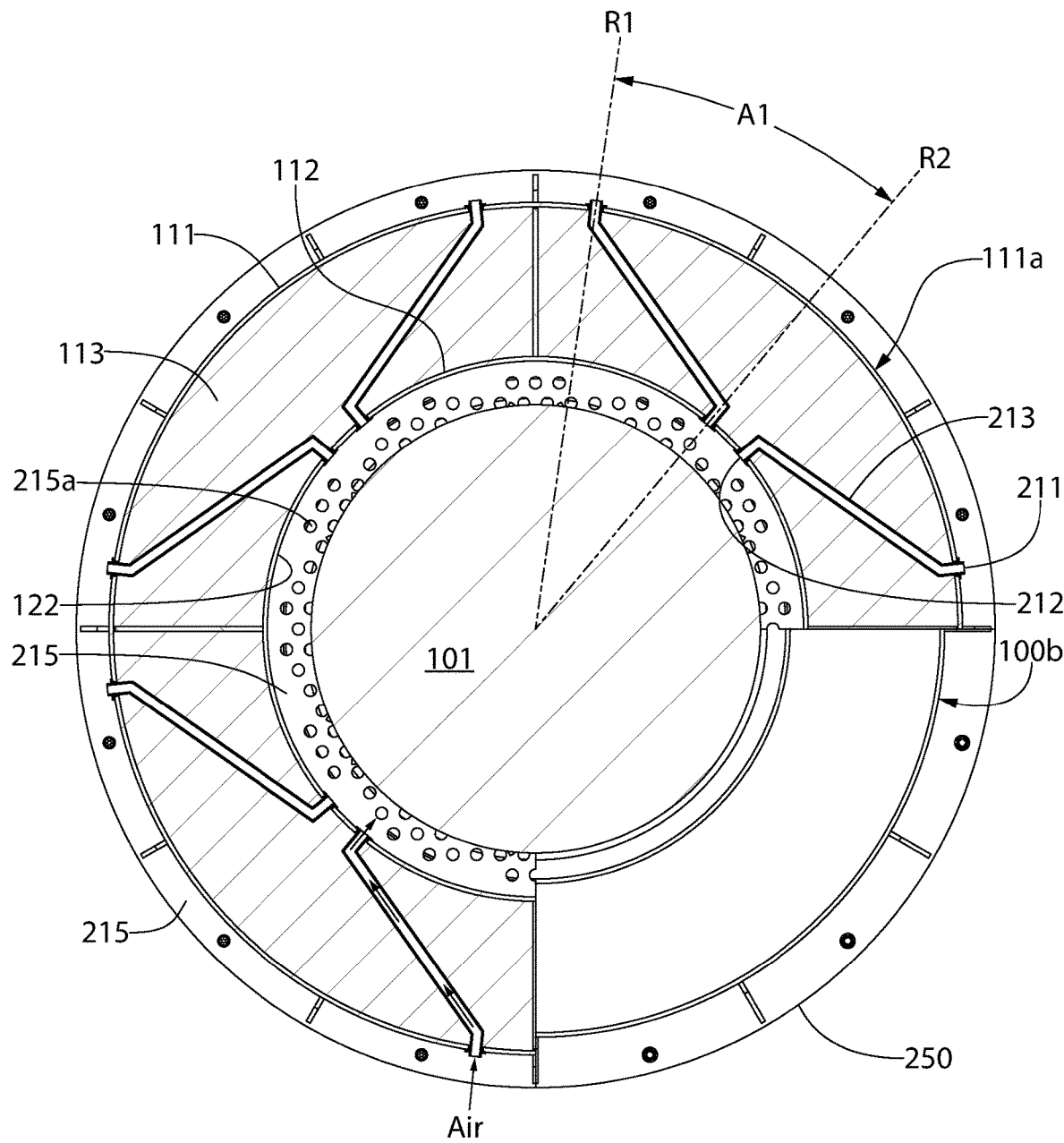
FIG. 12 is a second transverse cross sectional view taken from FIG. 7 showing the ventilation air inlet ducts of the upper cask.
Figure 13:
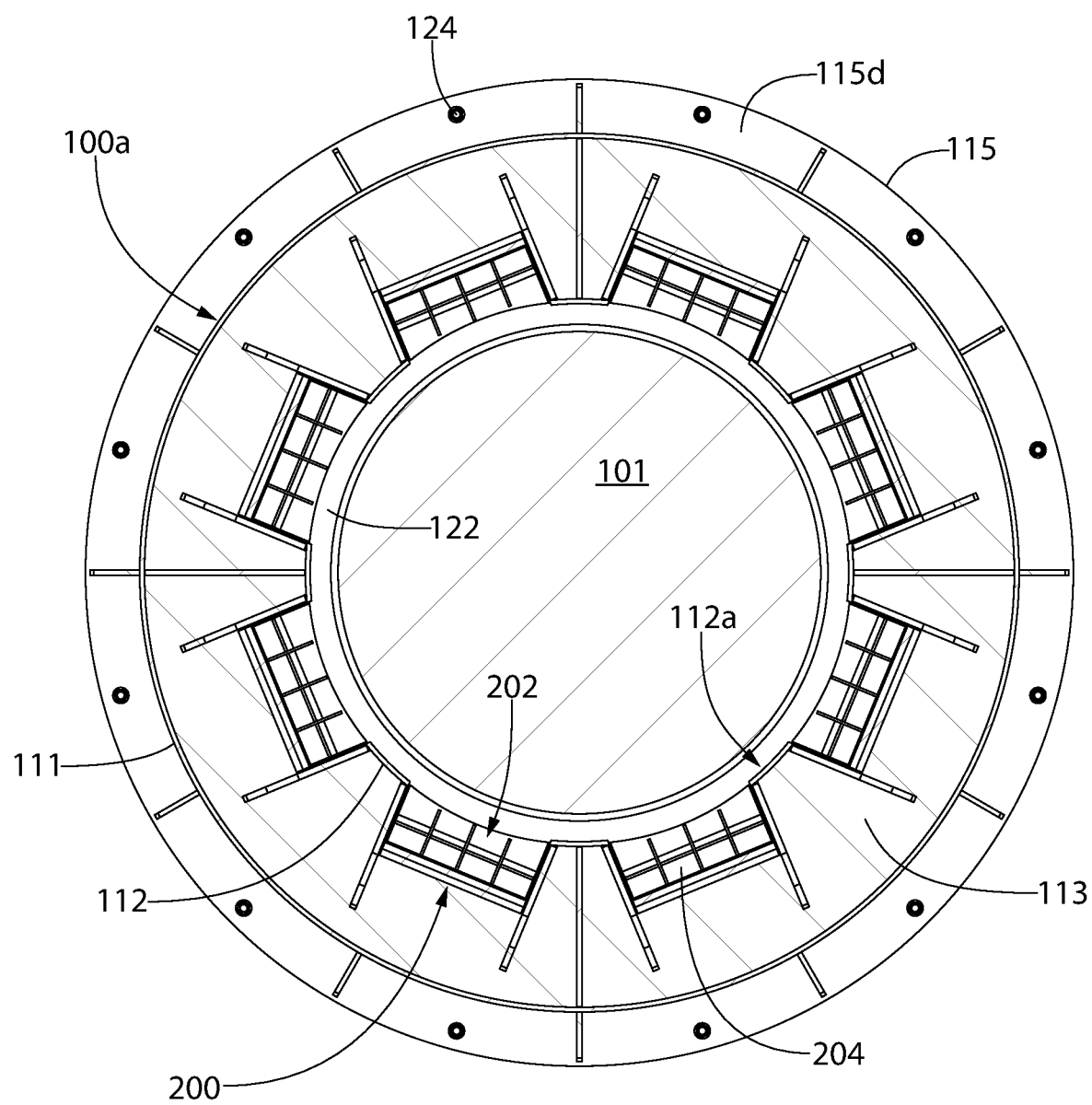
FIG. 13 is a third transverse cross sectional view taken from FIG. 7 showing the ventilation air inlet ducts of the lower cask.

As shown in FIG. 7, a cask-to-cask interface 248 is formed between the upper cask 100b and lower cask 100a. Specifically, the interface may be defined by the joint between the bottom mounting flange 250 of the upper cask defined by baseplate 215 and the upper mounting flange 251 of the lower cask defined by top closure plate 253. It bears special note that nuclear waste canister 101 in the cavity 121 of upper cask 101b is positioned above the interface 248 (e.g., bottom end of canister), and conversely the canister 101 in the cavity 121 of lower cask 100a is positioned below interface 248 (e.g., top end of canister). The prevents radiation shine or streaming through the cask-to-cask interface 248 from the casks radially outwards to the ambient environment.

A radiation-shielded closure lid 114 is detachably coupled to the top end 119 of upper cask 100b. Lid 114 closes the normally upwardly open cavity 121 of upper cask 100 when in place. Lid 114 may be a circular cylindrical structure comprising a hollow metal outer housing 114b defining an interior space filled with a radiation shielding material 114a such as a concrete plug or liner encased by the outer housing. Other shielding materials may be used in addition to or instead of concrete. Lid 114 provides radiation shielding in the vertical upward direction, whereas the concrete liner 113 disposed between the inner and outer shells 112, 111 of the cask body provides radiation shielding in the lateral or horizontal direction. With exception of the concrete liner, the foregoing lid-related components are preferably all formed of a metal such as without limitation steel (e.g. carbon or stainless).

Figure 6:
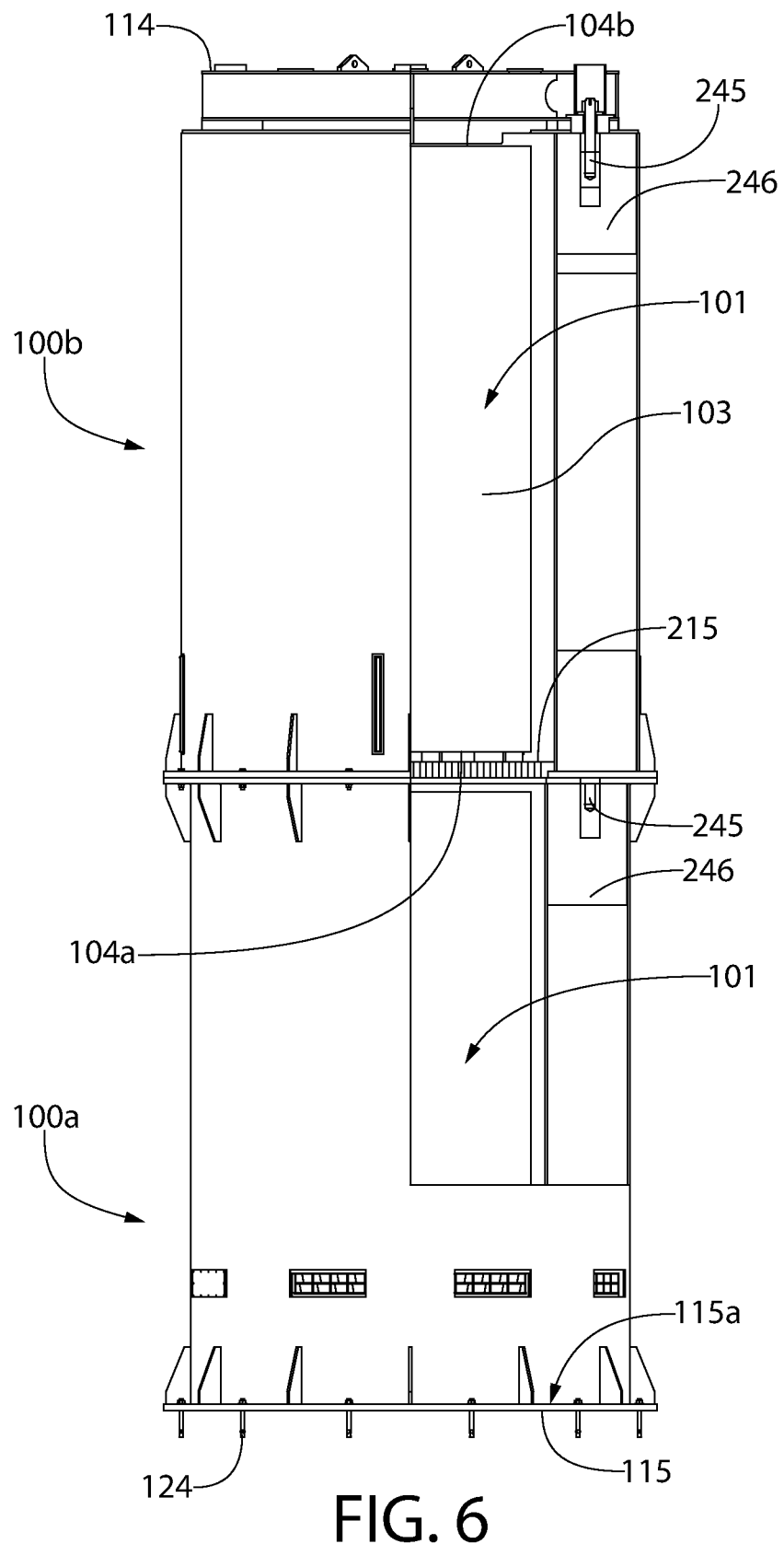
FIG. 6 is a second side view thereof with a cutaway to reveal nuclear waste canisters stored in each cask.

Housing 114b of lid 114 may include circular top cover plate 114b-1, circular bottom cover plate 114b-2, and a circumferentially-extending peripheral ring wall or shell 114b-3 extending vertically between the ring plate and top plate (see, e.g. FIG. 6). The top and bottom cover plates may be flat and the ring shell 114b-3 may be cylindrical in shape in a certain embodiment.

A plurality of circumferentially spaced apart cylindrical standoffs 241 may be provided which elevate the bottom cover plate 114b-2 of lid 114 above the top end 119 of either the lower or upper cask 100a, 100b depending on which cask the lid may be coupled, as further described herein. This provides a vertical gap of annular configuration which extends circumferentially all around the lid between the bottom cover plate and the top end of the cask to define an air outlet duct 240 through the lid to atmosphere. The air outlet duct 240 may extend 360 degrees all around the lid 114 except for interruptions by the standoffs 241. An annular mesh screen 244 with open flow areas encloses the air outlet duct 240 to prevent the ingress of debris or other materials into the cask, while concomitantly allowing the heated ventilation air to exit the lid back to atmosphere.

A central air collection recess 114c is formed beneath bottom cover plate 114b-2 of lid 114 on the underside of the lid by gap created by the standoffs 241. Central air collection recess 114c is downwardly open to internal cavity 121 of cask 100a or 100b to receive the vertically rising ventilation air from the ventilation annulus 122 which is heated by the canister. The central air collection recess collects the heated ventilation air and directs the air radially outwards back to ambient atmosphere through the air outlet ducts 240.

Figure 21:
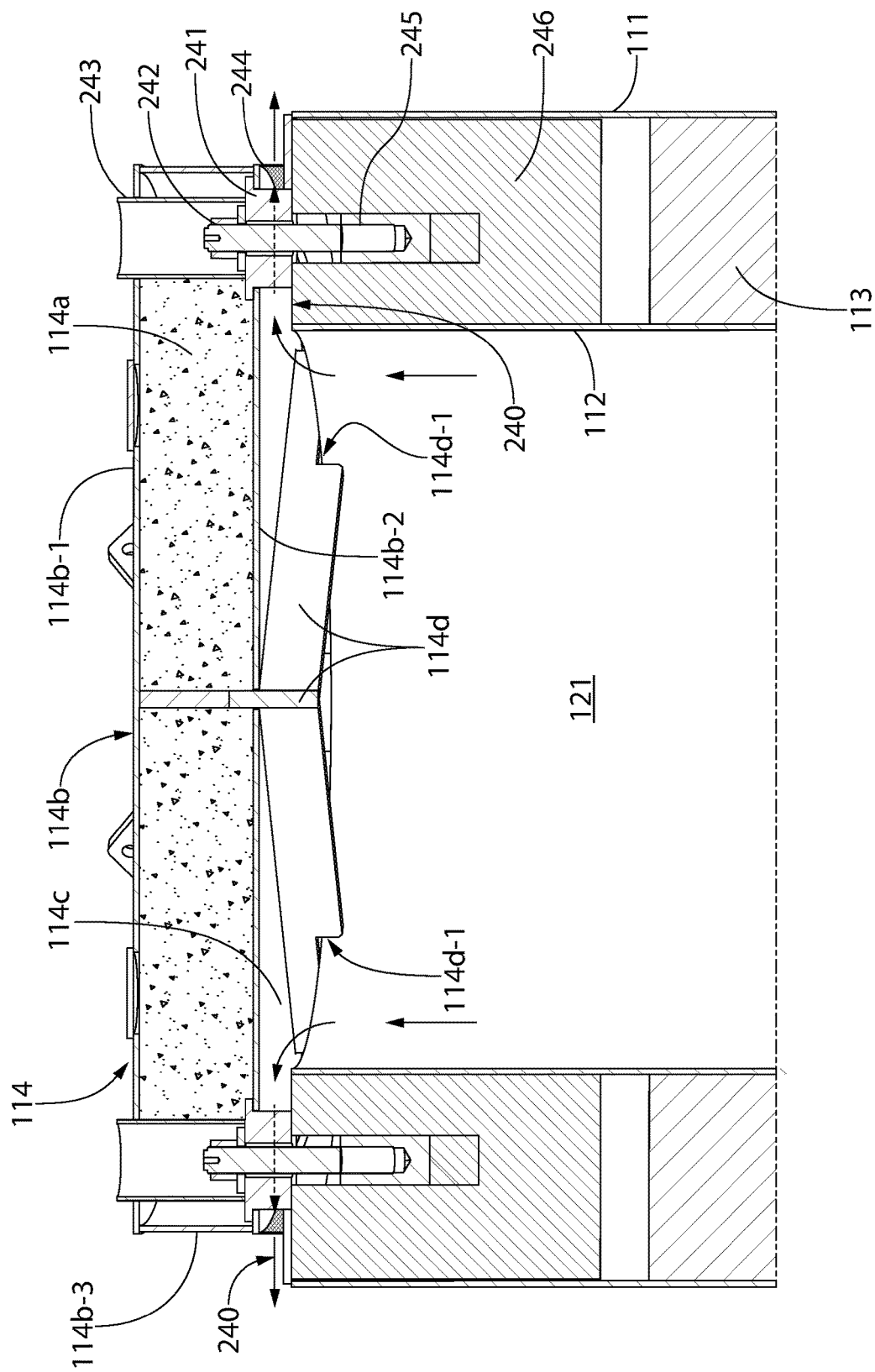
FIG. 21 is a vertical cross sectional view of the upper portion of the upper cask and closure lid.

Vertical stiffening plates 114d welded between the top and bottom cover plates through the concrete radiation shielding material 114a structurally stiffens the lid housing. In one embodiment, as best shown in FIG. 21, the stiffening plates are further configured and operable to detachably engage the top end 119 of the cask 100a or 100b to which the lid is mounted. For this purpose, the stiffening plates 114d may include a step-shaped cutout 114d-1 configured to engage the top end of the cask. The stiffening plates therefore serve to primarily support the full weight of the heavy radiation-shielded lid which is not imposed on the standoffs 241. The bottom cover plate 114b-2 may be welded to each of the standoffs which partially supports the weight of the lid.

It bears noting that the same lid 114 may be used or reused to enclose either the lower or upper cask 100a, 100b depending on how the nuclear waste storage system is deployed, as further described herein.

The standoffs 241 may play a further role in detachably coupling the lid 114 to the lower or upper cask 100a or 100b. Although the heavy weight of the concrete-filled lid tends to keep the lid in place on the cask, it is desirable to provide additional securement in form of bolting the lid to the cask. For that purpose, a plurality of threaded lid bolts 242 may be provided each of which extends vertically through one standoff 241 and threadably engages a mating threaded socket 245 provided in the top end 119 of the cask 100a or 100b. In one embodiment, each socket may be provided by a vertically oriented lid mounting plate 246 which is welded between inner and outer shells 112, 111 of the cask (see, e.g., FIG. 21). Each threaded socket is welded to its associated lid mounting plate which is embedded in the concrete radiation-shielding material 114a. Each standoff 241 includes a tubular access sleeve 243 which extends vertically through the radiation shielding material 114a of the lid 114 as shown to allow an operator to access the lid bolting.

Additional features of the passive ventilation air system used to cool the nuclear waste inside the lower and upper casks 100a, 100b will now be described.

The present nuclear waste storage system disclosed herein includes a natural circulation air ventilation system (i.e. unpowered by fans/blowers) for removing decay heat emitted from the canister 101 which holds the SNF or other high level radioactive waste. The cooling airflow provided by the ambient air surrounding the cask has flow driven by the natural convective thermo-siphon effect in which ventilation air within the ventilation annuluses 122 of the lower and upper casks 100a, 100b is heated by the canisters 101 therein which emit the heat generated by the decaying SNF or other radioactive waste stored inside. This air heating generates an upflow of the heated air within each annulus 122. This natural convection driven airflow effect is well understood in the art without further elaboration.

Referring generally to FIGS. 1-29 as applicable, the cask ventilation provisions of the lower cask 100a include a plurality of circumferentially spaced apart ventilation air inlet ducts 200 configured to draw in and introduce ambient ventilation air radially inwards into the internal cavity 121 of the lower cask 100a. Air inlet ducts 200 establish fluid communication between cask cavity 121 (including ventilation annulus 122 formed in the cavity between canister 101 and inner shell 112 of the cask body 110) and ambient atmosphere which provides the source of the cooling air. The air inlet ducts 200 may be circumferentially spaced apart around the perimeter/circumference of lower cask 100a. In one embodiment, inlet ducts 200 may be equally spaced apart and may include at least four ducts to uniformly deliver ambient cooling air to each quadrant of the nuclear waste canister 101 contained in internal cavity 121 of lower cask 100a. In the illustrated embodiment, each quadrant of the canister is cooled by a pair of inlet ducts 200 (i.e. 8 ducts total). In other embodiments, non-uniform/unequal circumferential spacing of the ducts may be provided.

In a one non-limiting preferred embodiment, the air inlet ducts 200 are disposed in and formed through the lower portion of cask body 110 proximate to the bottom end 120 of the cask and cavity 121 to introduce ambient cooling or ventilation air into the lower portion of the cavity and ventilation annulus 122. Accordingly, each air inlet duct 200 extends horizontally/laterally and radially completely through the sidewall 118 formed by the cask body 110 from outer shell 111 to inner shell 112. The radially oriented ducts 200 define air inlet passageways which place the lower portion of the cask cavity 121 and ventilation annulus 122 in fluid communication with ambient atmosphere and cooling air.

Air inlet ducts 200 each include an entrance opening 201 located at and penetrating the outer or external surface 111a of the lower cask outer shell 111 and an exit opening 202 located at and penetrating the inner or internal surface 112a of inner shell 111. A metallic flow conduit 203 of suitable configuration extends between and fluidly couples the entrance and exit of each inlet duct. The flow conduits 203 may have any suitable configuration and polygonal or non-polygonal cross-sectional shape. In one embodiment, as shown, the flow conduits may have a box-like configuration with a rectilinear cross-sectional shape (e.g., rectangular or square). Each flow conduit 203 extends radially through the sidewall 118 of the lower cask body 110 (i.e. shells 111, 112 and radiation shielding material 113 therebetween) to fluidly connect ambient air to the internal cavity 121 and ventilation annulus 122 of the cask 100. The flow conduit 203 may therefore be embedded within the radiation-shielding material liner of the lower cask 100a.

To prevent radiation streaming from the SNF or other radioactive waste stored inside the canister 101 when disposed in lower cask 100a to the ambient environment through the inlet ducts 200, each inlet duct 200 may have a circuitous configuration to draw ambient ventilation air radially inwards into the cask cavity 121 in a circuitous path such that no straight line of sight exists between an external entrance opening 201 and an internal exit opening 202 of each air inlet duct. To provide such a configuration, the entrance opening 201 may be vertically offset from exit opening 202 of the duct. In one embodiment, the entrance opening 201 may be located higher than the exit opening 202 of each air inlet ducts 200. The flow conduit 203 extending therebetween may be obliquely angled to vertical (i.e. vertical centerline axis of the stacked cask assembly defined by cavity axes CA1, CA2) to eliminate any straight line of sight (see, e.g., FIGS. 14 and 23). Advantageously, locating and spacing the entrance opening 201 spaced above the baseplate 115 of lower cask 100a which is founded on the concrete pad S also provides protection against the ingress of water should the nuclear waste storage facility (e.g., ISFSI) experience flooded conditions.

Figure 14:
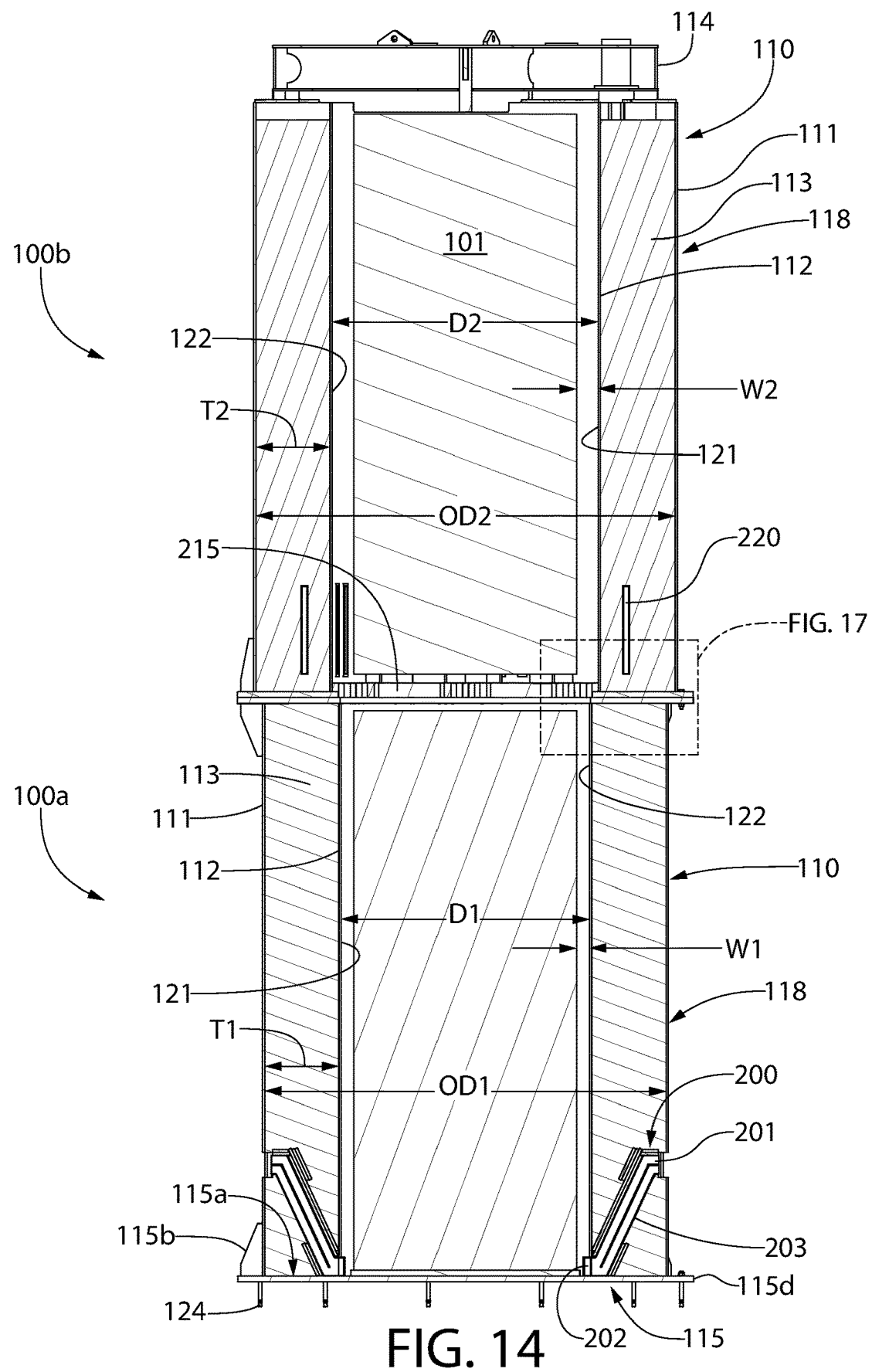
FIG. 14 is a first side vertical cross-sectional view of the cask assembly of FIG. 1A.
Figure 23:
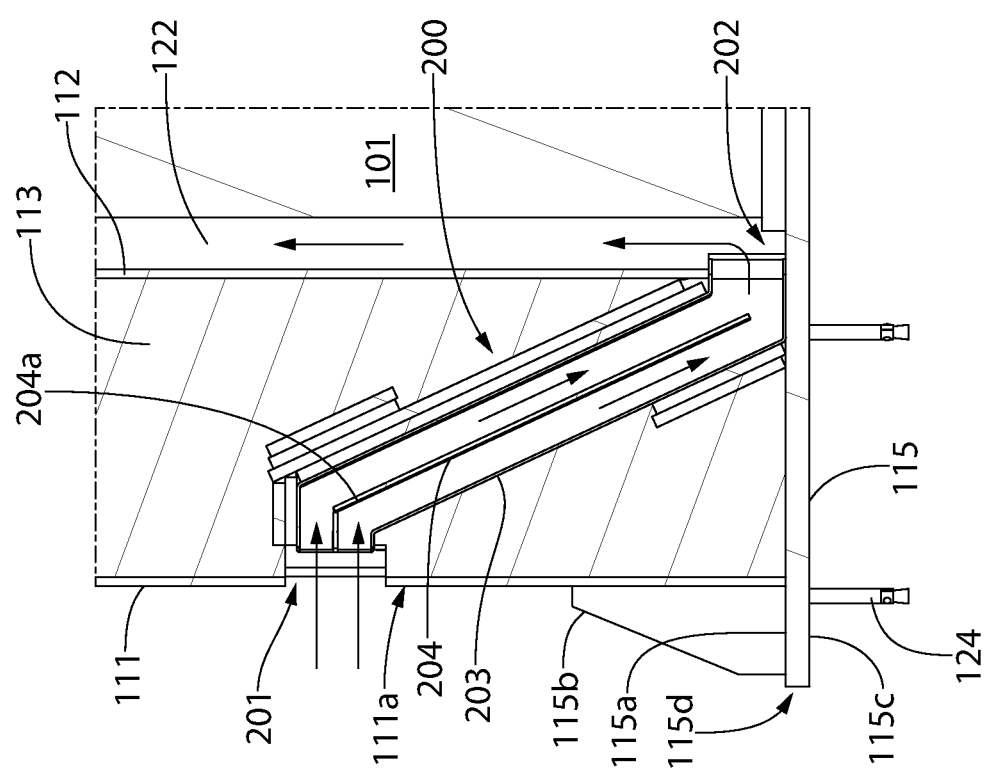
FIG. 23 is an enlarged detailed cross sectional view of one of a plurality ventilation air inlet ducts of the lower cask.
Figure 25:
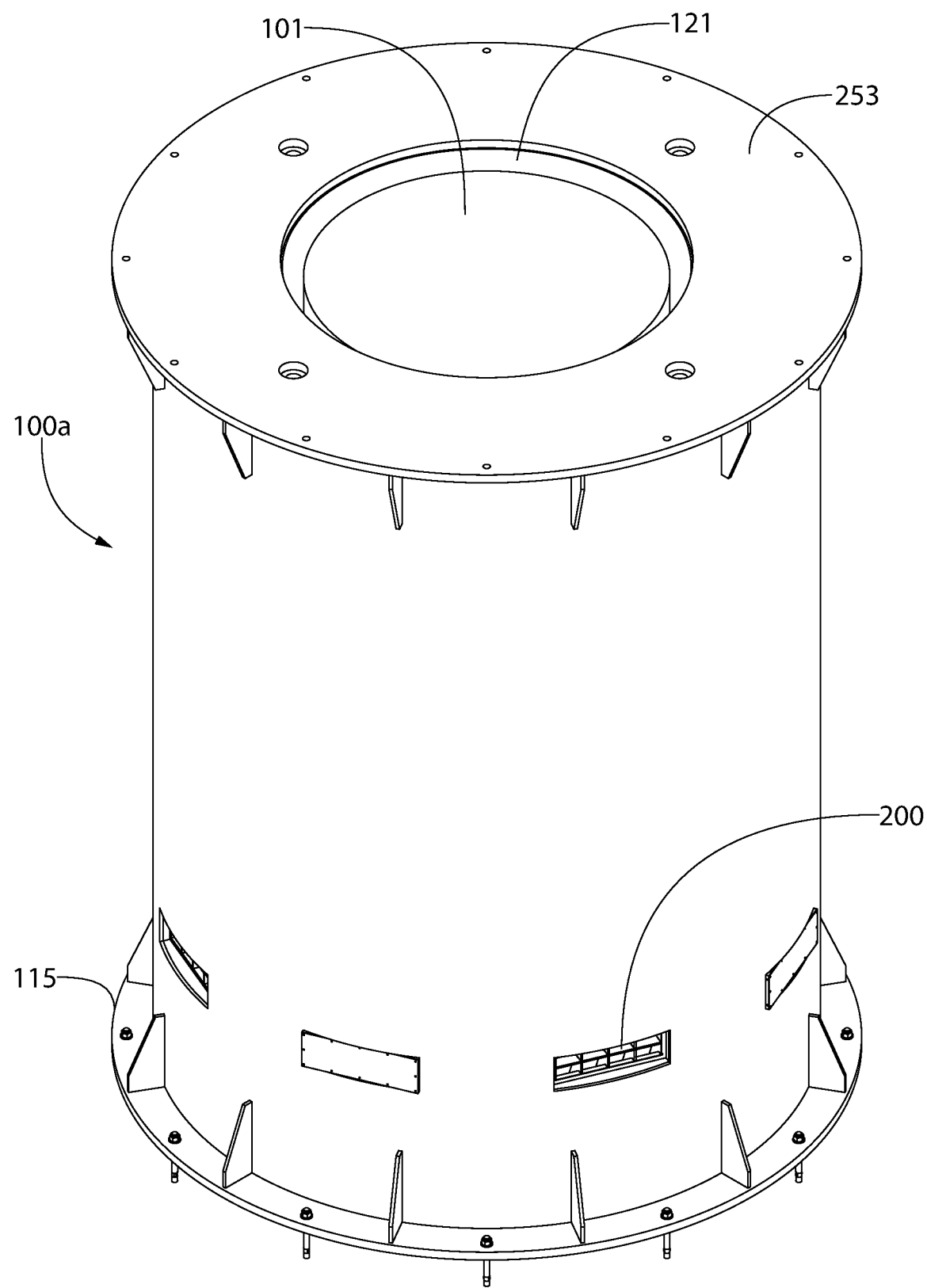
FIG. 25 is a top perspective view of the lower cask alone with nuclear waste canister therein.

In one embodiment, the exit opening 202 of each ventilation air inlet duct 200 may be located directly adjacent to top surface 115a of baseplate 115 (see, e.g. FIGS. 14 and 23). This ensures that the ambient cooling air is drawn radially inwards and introduced directly into the very bottom of the ventilation annulus 122 inside the lower cask 100a to maximize canister cooling effectiveness.

To further guard against straight-line radiation streaming from the cask cavity 121 to the ambient environment through the air inlet ducts 200, some or all of inlet ducts 200 may be fitted with an internal gamma shield insert 204 formed by an orthogonal grid array of shielding plates 204a. The shielding plates 204a may extend through the ducts between the entrance opening 201 and the exit opening 202 inside the cask cavity 121 for a majority of the length of the flow conduits 203 (see, e.g., FIG. 23). Ambient cooling air flows through openings formed by the grid array of shielding plates 204a.

In some instances, the heat load from the nuclear waste canister 101 stored in the lower cask 100a may be such that the ventilation air within the ventilation annulus 122 becomes extremely hot as it absorbs the thermal energy (i.e. decay heat) from the nuclear waste in the canister. This already heated air entering the upper cask 100b above may not be cool enough to effectively remove heat from the canister stored in the upper cask to a degree sufficient to protect the structural integrity of the spent nuclear fuel cladding.

Accordingly, in some preferred but non-limiting embodiments, the nuclear waste storage system disclosed herein may include the lower set of air inlet ducts 200 formed in the lower cask 100a and vertically spaced apart upper set of air inlet ducts 220 formed in the upper cask 100b. The plurality of the upper ventilation air inlet ducts 220 are configured to configured to draw in and introduce ambient ventilation air radially inwards into the internal cavity 121 of the upper cask 100b. Air inlet ducts 220 establish fluid communication between cask cavity 121 of upper cask 100b (including ventilation annulus 122 formed in the cavity between canister 101 and inner shell 112 of the cask body 110) and ambient atmosphere which provides the source of the cooling air. The air inlet ducts 220 may be circumferentially spaced apart around the perimeter/circumference of upper cask 100b. The inlet ducts 220 may be equally or unequally spaced apart and may include at least four ducts to deliver ambient cooling air to each quadrant of the nuclear waste canister 101 contained in internal cavity 121 of upper cask 100b. In the illustrated embodiment, each quadrant of the canister is cooled by a pair of inlet ducts 220 (i.e. 8 ducts total).

In one non-limiting preferred embodiment, the air inlet ducts 220 are disposed in and formed through the lower portion of the upper cask body 110 proximate to the bottom end 120 of the cask and cavity 121 therein to introduce ambient cooling or ventilation air into the lower portion of the cavity and upper ventilation annulus 122 of the upper cask 100b. Accordingly, each air inlet duct 220 extends horizontally/laterally and radially completely through the sidewall 118 formed by the cask body 110 from outer shell 111 to inner shell 112. The radially oriented ducts 220 define air inlet passageways which place the lower portion of the cask cavity 121 and ventilation annulus 122 of upper cask 100b in fluid communication with ambient atmosphere and cooling air.

Air inlet ducts 220 of upper cask 100b introduces fresh cool ambient ventilation air radially inwards into the upper cask cavity 121 where it mixes with already heated ventilation air flowing vertically upwards from the lower cask 100a into the upper cask cavity. Advantageously, this mixing of air streams tempers and cools the rising heated ventilation air from the lower cask 100a so that it is better able to absorb heat emitted by the nuclear waste canister 101 inside the upper cask 100b. The stacked assemblage of the lower and upper casks 100a, 100b therefore are cooled by two vertically spaced apart sets of air inlet ducts comprising the lower air inlet ducts 200 formed in the lower cask and the upper air inlet ducts 220 formed in the upper cask. This provides adequate cooling capacity for the heat load generated by the thermal energy emissions for both nuclear waste canisters 101 accommodated by the nuclear waste storage system.

Similarly to air inlet ducts 200 of lower cask 100a, the air inlet ducts 220 of the upper cask 100b each include an entrance opening 211 located at and penetrating the outer or external surface 111a of the upper cask outer shell 111 and an exit opening 212 located at and penetrating the inner or internal surface 112a of inner shell 111. A metallic flow conduit 213 of suitable configuration extends between and fluidly couples the entrance and exit of each inlet duct. The flow conduits 213 may have any suitable configuration and polygonal or non-polygonal cross-sectional shape. In one embodiment, as shown, the flow conduits may have a box-like configuration with a rectilinear cross-sectional shape (e.g., rectangular or square). Air inlet ducts 220 of upper cask 100b may be vertically elongated in configuration whereas air inlet ducts 200 of lower cask 100a may be horizontally elongated as shown in one non-limiting embodiment.

Each flow conduit 213 of the upper air inlet ducts 220 extends radially through the sidewall 118 of the upper cask body 110 (i.e. shells 111, 112 and radiation shielding material 113 therebetween) to fluidly connect ambient air to the internal cavity 121 and ventilation annulus 122 of the upper cask 100b. The flow conduit 213 may therefore be embedded within the radiation-shielding material liner of the upper cask 100b.

To prevent radiation streaming from the SNF or other radioactive waste stored inside the canister 101 when disposed in upper cask 100b to the ambient environment through the inlet ducts 220, each inlet duct 220 may have a circuitous configuration (similarly to inlet ducts 200 of lower cask 100b) to draw ambient ventilation air radially inwards into the cask cavity 121 in a circuitous path such that no straight line of sight exists between external entrance opening 211 and the internal exit opening 212 of each air inlet duct. To provide such a circuitous configuration, the entrance opening 211 may be radially and angularly offset from exit opening 212 of the duct. In one non-limiting example, the entrance opening 211 may be located at a first angular position defined by a radial reference line R1 and the exit opening 212 may be located at a second angular position defined by a second radial reference line R2 (see, e.g., FIG. 12). The entrance and exit openings 211, 212 may be angularly offset at an angle A1 between about and including 20 to 40 degrees. Angle A1 may be about 30 degrees in one preferred but non-limiting embodiment. The flow conduit 213 located therebetween extends transversely to radial references lines R1 and R2 through the radiation-shielding material 213 liner of the upper cask body 110 as shown to fluidly coupled the entrance and exit openings. The foregoing configuration and arrangement eliminates any straight line of sight through the upper set of air inlet ducts 220 (see, e.g., FIG. 12).

It bears noting that the radial position/angular offset used for the upper set of air inlet ducts 220 in the upper cask 100b to prevent straight-line radiation streaming contrast to the alternate vertical offset approach used for the lower set of air inlet ducts of the lower cask 100a. Because the upper set of air inlet ducts 220 are located substantially above the concrete pad S on which the cask assembly is mounted (e.g., more than 15 feet), the vertical offset approach to prevent the ingress of flood water into the lower cask is not necessary. However, the vertical or radial/angular offset approach and arrangement may be used in other embodiments for either the upper or lower set of air inlet ducts 220 or 200. The invention is not limited in this respect.

In operation of the passive ventilation air cooling system, air residing inside the ventilation annulus 122 of the lower cask 100a between the canister 101 and inner shell 112 is heated by the thermal energy emitted by the canister (i.e. nuclear waste container therein). The heated ventilation air rises flowing vertically upwards within the annulus to the open top end of the lower cask. Due to the natural convective thermo-siphon effect, the rising heated ventilation air concurrently draws available ambient cooling air surrounding the cask radially inwards through the lower set of air inlet ducts 200 adjacent to the bottom of the lower cask 100a. Concurrently, air residing inside the ventilation annulus 122 of the upper cask 100b between the canister 101 and inner shell 112 is heated by the thermal energy emitted by the canister (i.e. nuclear waste container therein). This heated ventilation air inside upper cask 100b rises flowing vertically upwards within the annulus to the top end of the upper cask beneath the lid 114. Due to the natural convective thermo-siphon effect, the rising heated ventilation air concurrently draws available ambient cooling air surrounding the cask radially inwards through the upper set of air inlet ducts 220 adjacent to the bottom of the upper cask 100b.

The process continues with the rising heated ventilation air in the lower cask 100a which leaves the lower cask and flows through the through holes 215a of the upper cask perforated baseplate 215 to enter the bottom of the ventilation annulus 122 inside upper cask 100b. This heated ventilation air mixes with cool ambient air drawn into the upper cask 100b via the upper set of air inlet ducts 220 as previously described herein. The mixed air is further heated by the canister 101 in the upper cask 100b as noted above. The further heated ventilation air continues to flow upwards and reaches the top end of the upper cask from which it is discharged back to atmosphere through air outlet ducts 240 defined by closure lid 114. This ventilation air circulation pattern continues indefinitely as long as the canisters emit some degree of heat.

Figure 17:
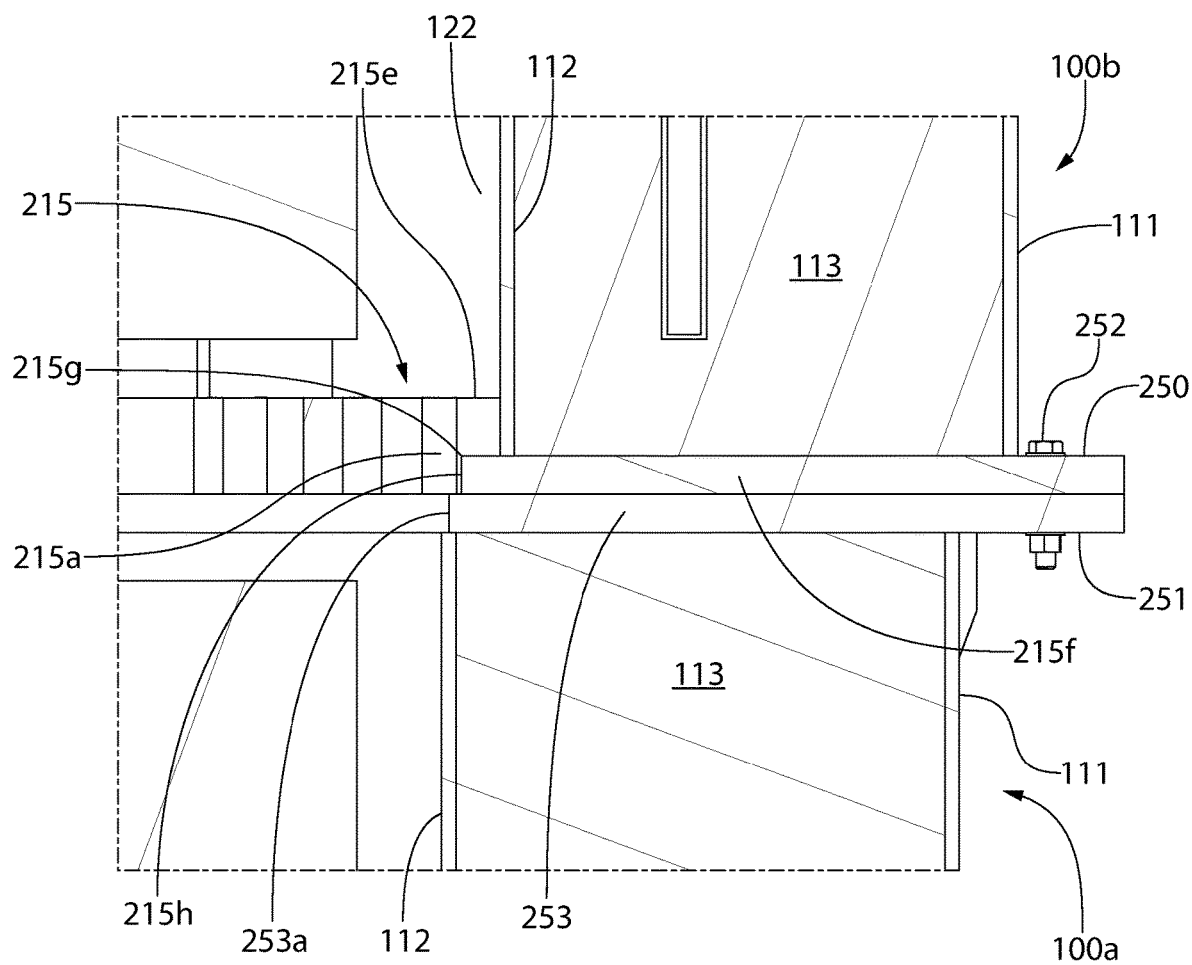
FIG. 17 is a detail taken from FIG. 14.
Figure 18:
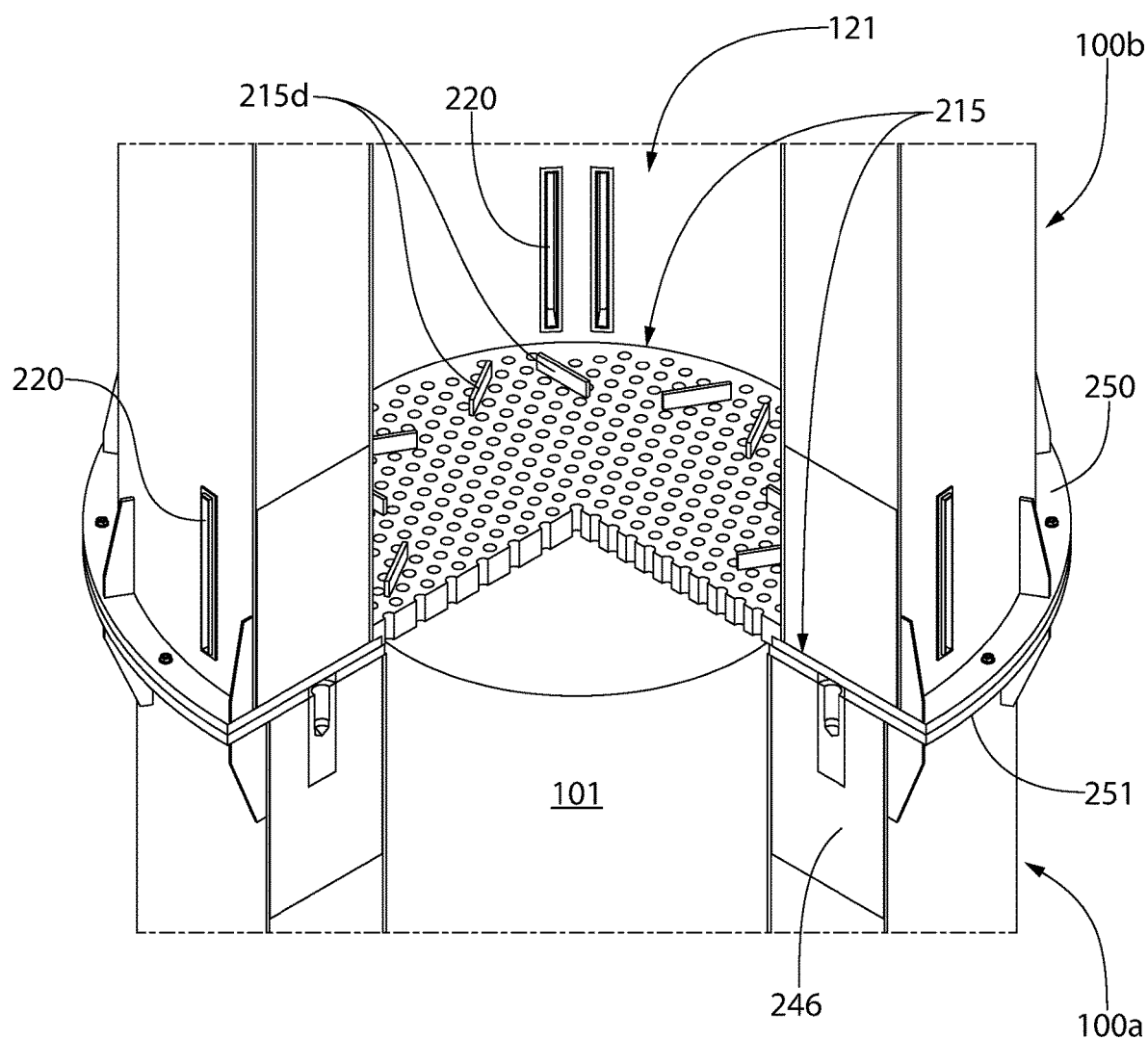
FIG. 18 is a partial cross sectional view of the cask assembly with cutaway to reveal the perforated baseplate of the upper cask.
Figure 19:
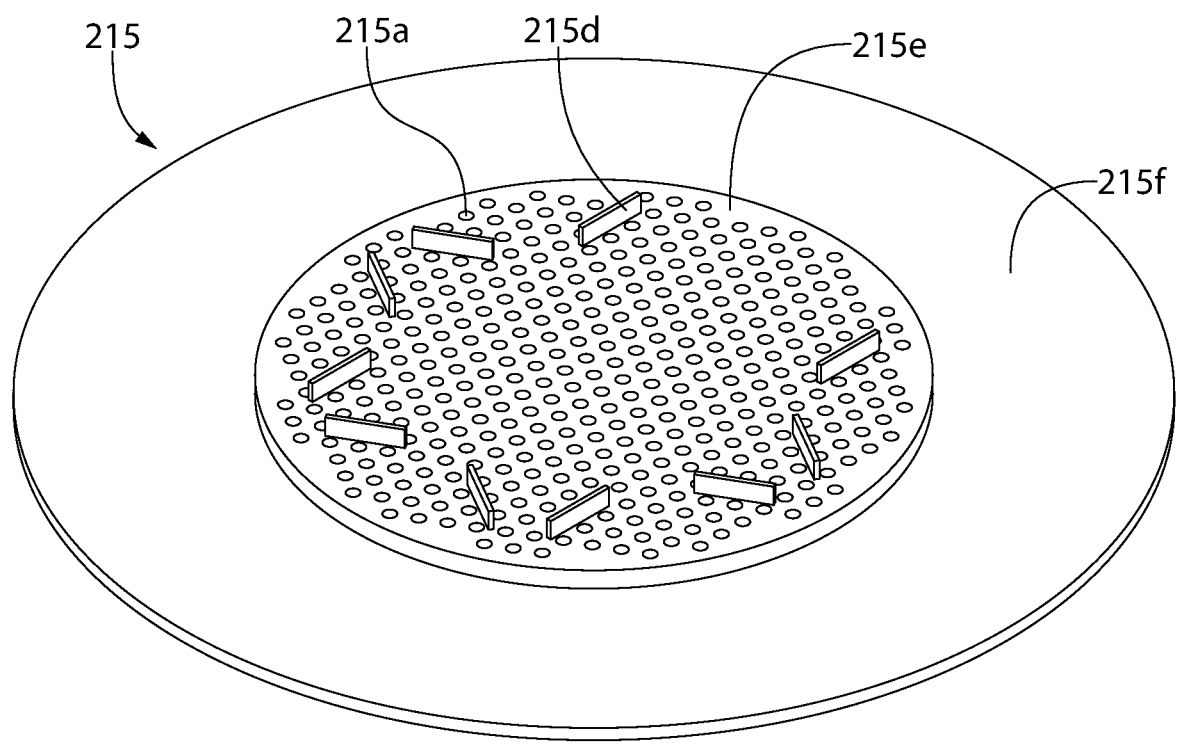
FIG. 19 is a perspective view of the baseplate of FIG. 18 in isolation.
Figure 20:
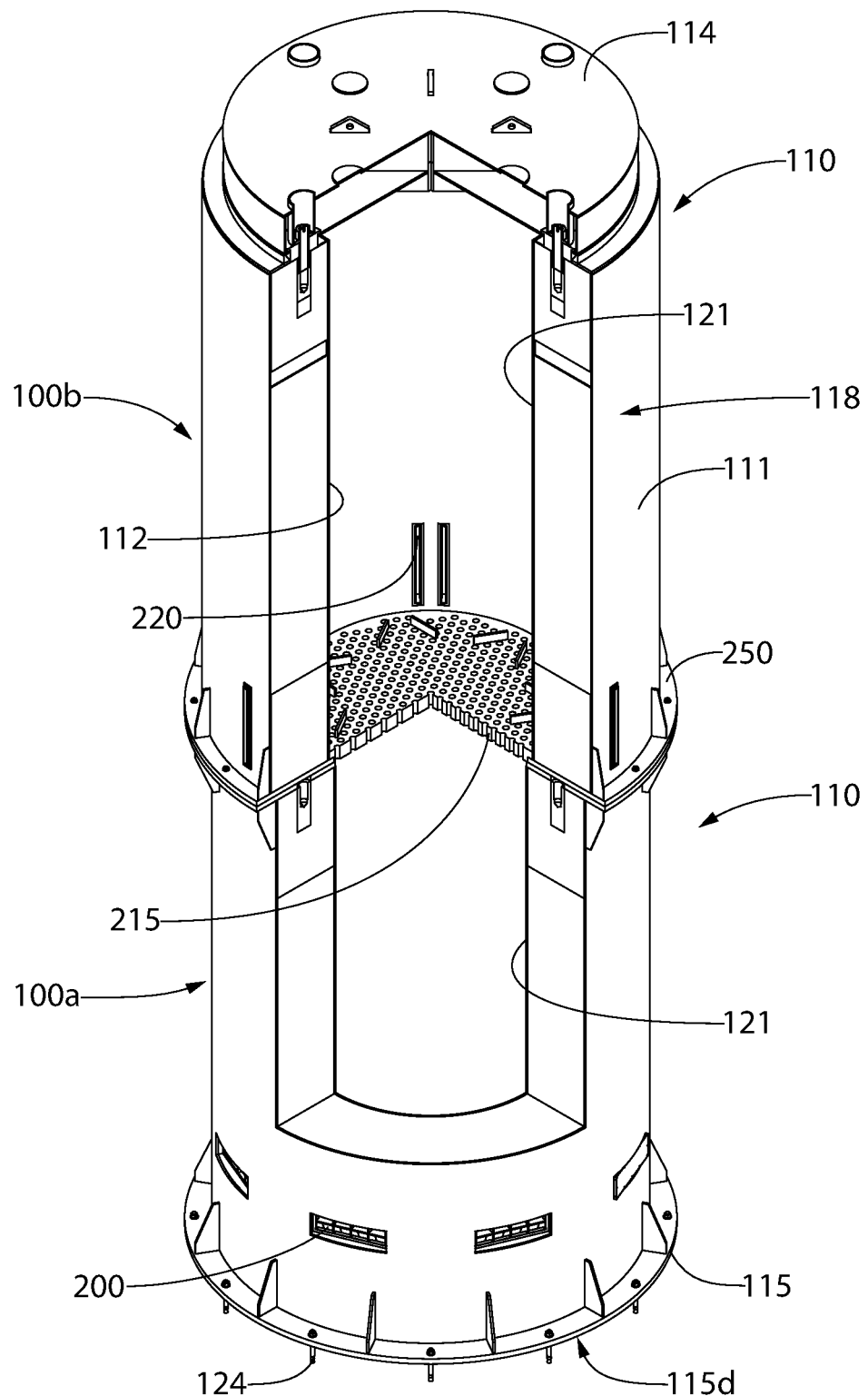
FIG. 20 is top perspective view of the cask assembly without the nuclear waste canisters in place to better show the interior of the cask assembly.
Figure 22:
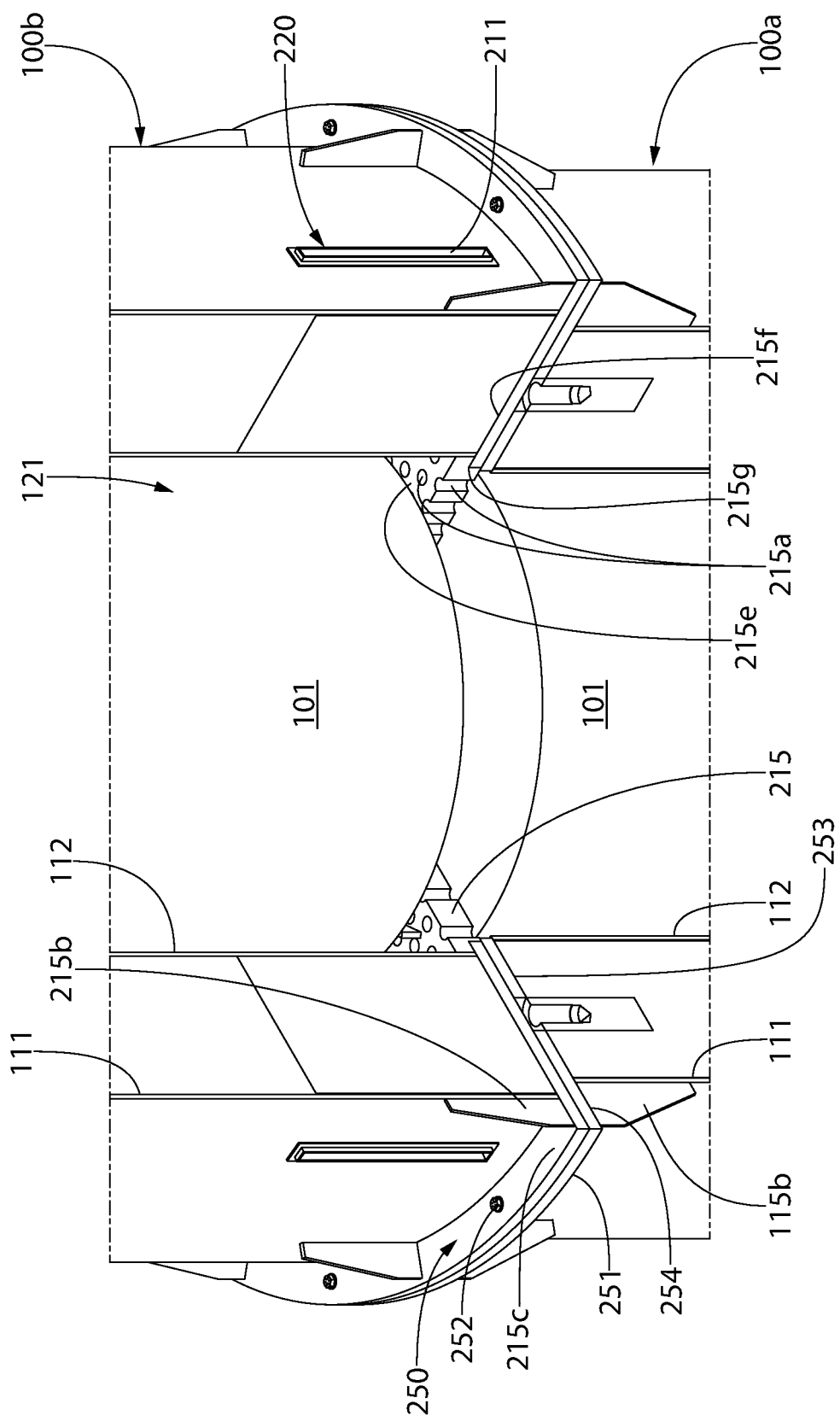
FIG. 22 is a partial perspective view of the joint and interface between the upper and lower casks with cutaway to show the perforated baseplate of upper cask supporting the canister therein.
Figure 24:
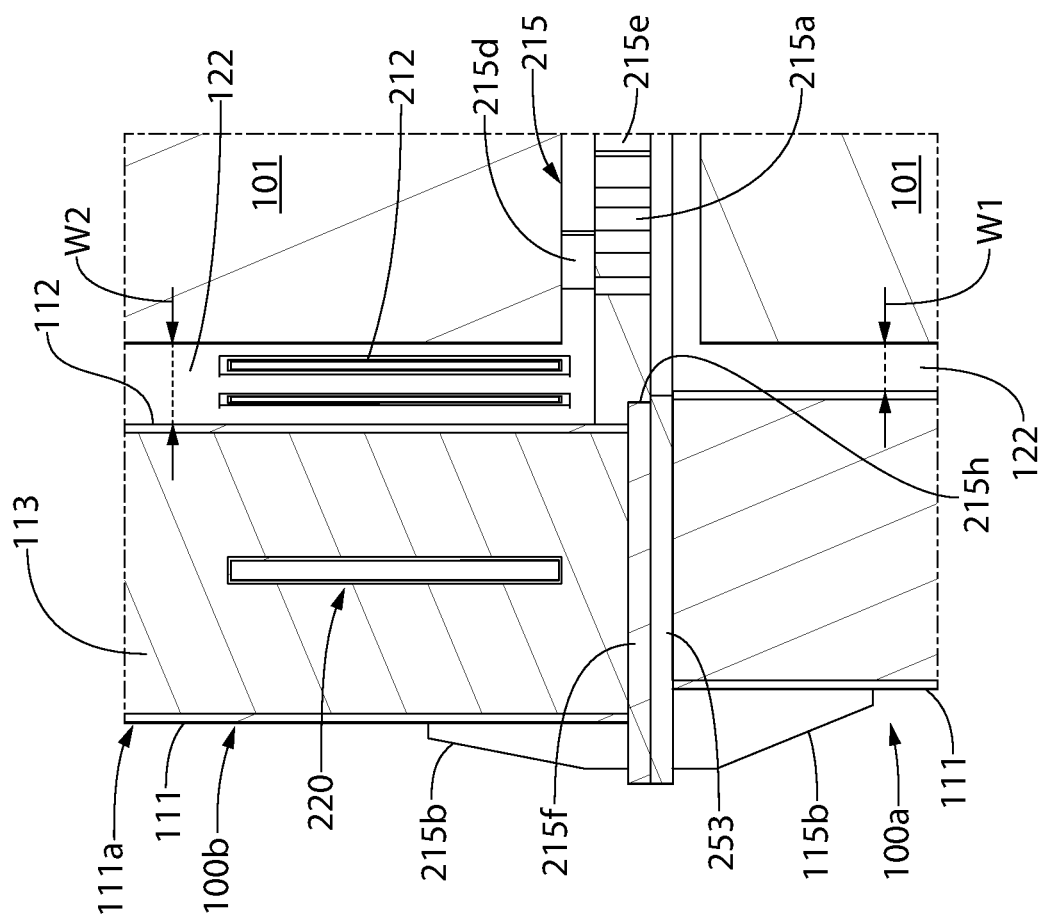
FIG. 24 is an enlarged detailed cross sectional view of one of a plurality of ventilation air inlet ducts of the upper cask.

The inter-cask mounting system will now be briefly described for detachably coupling upper cask 100b on top of lower cask 100a. Referring to FIGS. 17, 22, and 24 at present, in one implementation an annular radially protruding mounting flange 250 at the bottom end of the upper cask 100b may be bolted to a mating annular radially protruding mounting flange 251 at the top end of the lower cask 100a by a plurality of threaded fasteners 252 such as bolts. In one embodiment, mounting flange may be defined by the peripheral portion 215c of perforated baseplate 215 which projects radially outward beyond outer shell 111 of upper cask 100b. Mounting flange 251 on lower cask 100a may be defined by a flat annular top closure plate 253 welded to the top ends of the inner and outer shells 112, 111 of the cask. The closure plate defines a central opening 253a through which ventilation may exit lower cask 100a and flow upwards into upper cask 100b. Closure plate 253 includes a peripheral portion 254 which projects radially outward beyond outer shell 111 of lower cask 100a and defines mounting flange 251. The mounting flange 251 may be structurally reinforced by a plurality of circumferentially spaced apart angled gusset plates 115b (similar to the gusset plates 115b used for baseplate 115) welded to the mounting flange 251 and the upper portion of the external surface 111a of outer shell 111 of lower cask 100a. A flat-to-flat interface is formed between the mating mounting flanges 250, 251 as shown.

In some embodiments, instead of a single monolithic unitary structure which can be provided, the perforated baseplate 215 of upper cask 100b alternatively may have a two-piece construction as shown in FIGS. 17, 22, and 24. This includes a circular central portion 215e located inside the cavity 121 for supporting the canister 101 (which is perforated with the axial through holes 215a previously described herein), and an outer annular portion formed by a flat annular bottom closure plate 215f welded to the bottom ends of the upper cask cylindrical outer and inner shells 111, 112. Closure plate 215f defines a central opening 215h which allows rising air from the lower cask 100a to flow through the perforated central portion 215e of the baseplate 215 into the internal cavity 121 of upper cask 100b. The bottom closure plate 215f may be considered part of the entire structure of the baseplate 215. It bears noting that bottom closure plate 215f defines the peripheral portion 215c of baseplate 215, which in turn defines the mounting flange 250 for coupling the upper cask 100b to lower cask 100a.

The perforated central portion 215e of baseplate 215 may be supported by an inner portion of bottom closure plate 215f located inside cavity 121 of upper cask 100b via an annular stepped shoulder 215g in one embodiment. Central portion 215e may loosely engage the stepped shoulder 215g of bottom closure plate 215f to be removable, or alternatively may be welded to outer closure plate 215f for rigid fixation thereto. For the former loose coupling mounting, the circular perforated central portion 215e may be inserted through the top end of upper cask 100b after the annular bottom closure plate 215f is welded to outer and inner shells 111, 112 of the upper cask body.

In one embodiment, the central portion 215e may be thicker in construction than the bottom closure plate 215f of upper cask 100b as depicted herein because the central portion supports the weight of the canister 101 in the upper cask (see, e.g., FIGS. 17, 22, and 24). In other possible constructions, the entire baseplate 215 may have a uniform thickness.

Deployment of Stackable Nuclear Waste Storage System

There are at least two deployment scenarios in which the stackable cask system may be used to store nuclear waste at an ISFSI or other site. A method or process for storing nuclear waste will now be summarized with respect to these scenarios and variations thereof. General reference is made to FIGS. 26-29 which show various sequential steps of the method or process.

In a first deployment scenario, one or more lower casks 100a alone may be used at a first point in time for a period of time until additional nuclear waste storage capacity is required in the future at the storage site. The mounting of the lower and upper casks 100a, 100b into the tiered assemblage disclosed herein is therefore intended to be staggered over time instead of during the same temporal installation process as in the second scenario described below. Each lower cask 100a may be positioned on the concrete pad S of the storage facility at the permanent installation location on the concrete pad without anchorage to the pad for seismic stability as permitted per governmental regulations (e.g., Nuclear Regulator Commission-NRC) based on the ability of the cask to resist toppling moments induced by the vibrations occurring during a seismic event (i.e. earthquake). If anchorage is required for single cask use, the cask 100a may be anchored to the pad via the mounting fasteners 124 and baseplate 115 (i.e. mounting flange 115d portion). It bears noting that the threaded mounting fasteners 124 may be preinstalled and embedded in concrete pad S along a compatible bolt circle at the intended permanent mounting location for the lower cask 100a if embedded anchor bolts are to be used. In such a case, positioning the cask includes aligned the bolt holes in the lower mounting flange 115d of lower cask 100a with respective threaded mounting fasteners 124. In other approaches, the mounting fasteners may be installed after positioning the lower cask in the desired location on the pad.

With the lower cask 100a positioned and optionally anchored to the concrete pad S, a first nuclear waste canister 101 is lowered and inserted into the cask cavity 121 onto baseplate 115. The canister 101 is in a dry condition and may be loaded into cask 100a via a commercially-available transfer cask which is a lighter vessel with thinner walls providing less radiation shielding (sidewalls without concrete) than heavier thick walled storage casks with concrete sidewalls such as lower and upper casks 100a, 100b. Transfer casks are typically submerged in the fuel pool with a nuclear waste canister (e.g., MPC) pre-loaded therein, which is then with SNF assemblies in a known manner. The canisters are in a wetted condition inside the transfer cask rather than a dry condition such as when canisters 101 disclosed herein are loaded into the lower and upper casks 100a, 100b. Examples transfer casks which may be used are disclosed in commonly-owned U.S. Pat. Nos. 9,466,400 and 7,330,525, which are incorporated herein by reference in their entireties. Transfer casks may also be used to load the canister into the upper cask 100b described below.

Figure 26:
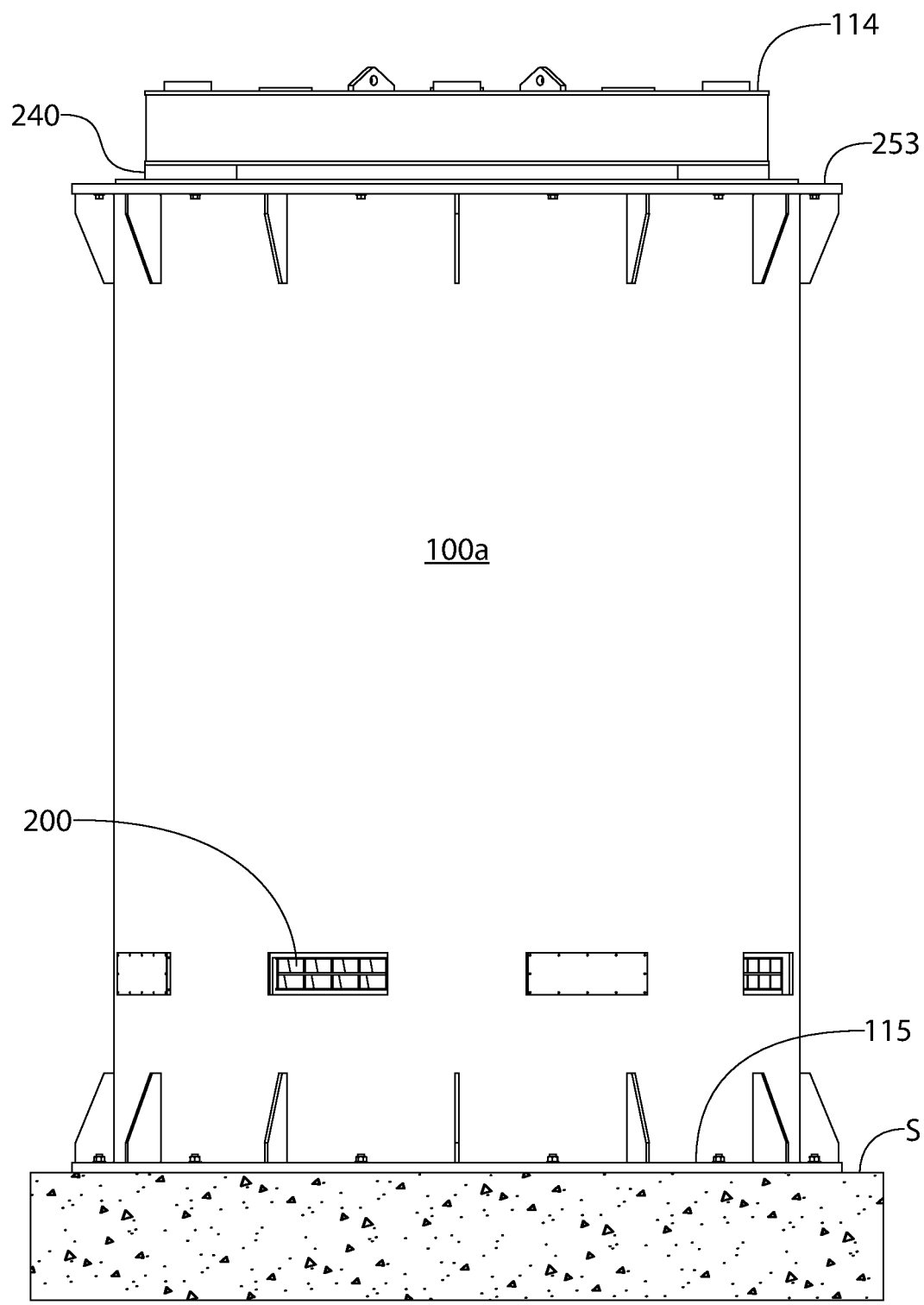
FIG. 26 is a side view of the lower cask seated on the concrete top pad with lid in place for operation by itself.
Figure 27:
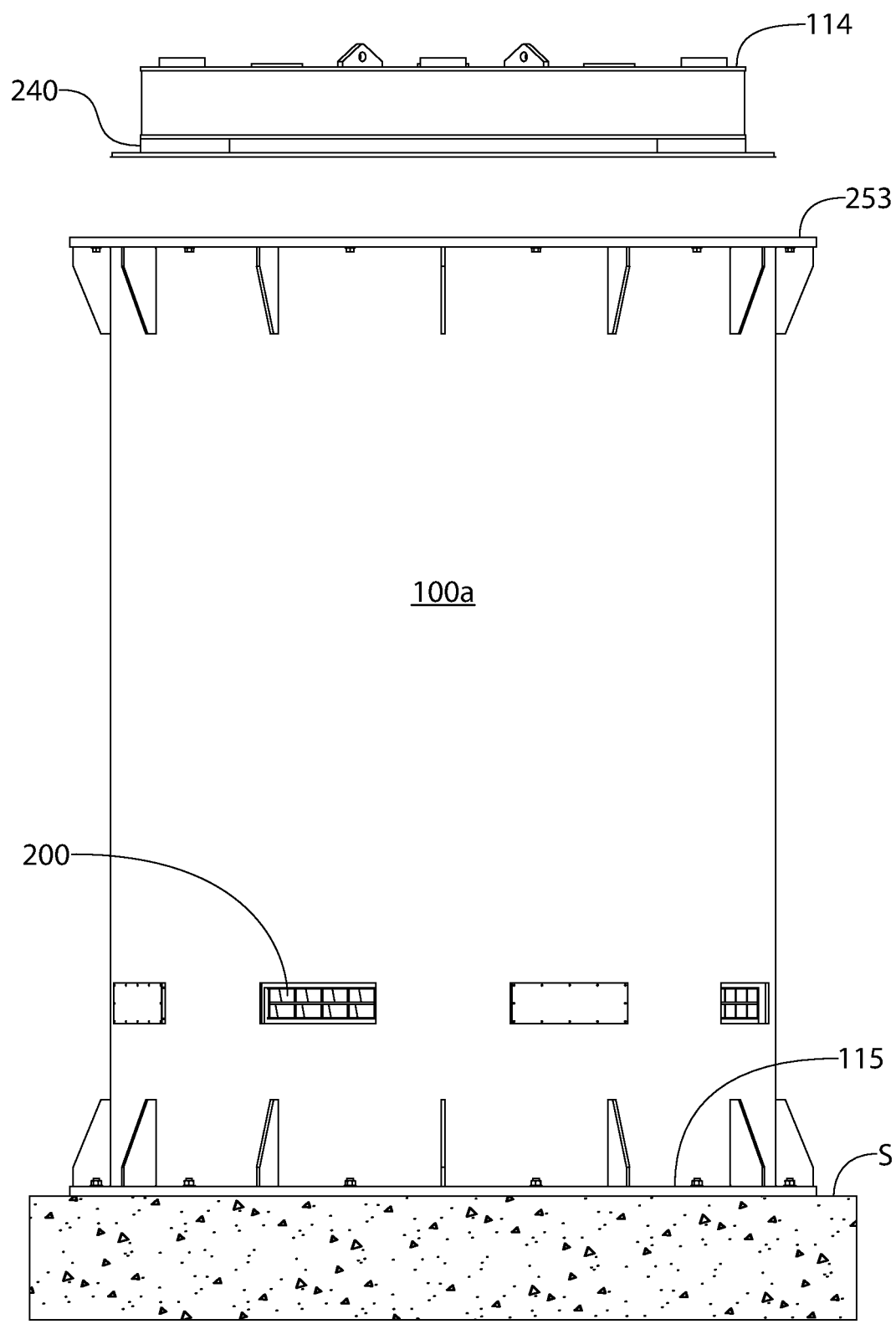
FIG. 27 is a side view thereof with lid removed to start the process of stacking and mounting the upper cask on the lower cask.

With the canister now emplaced, a lid 114 is then positioned on and mounted via bolting to the top end 119 of the lower cask 100a in the same manner described above for mounting the lid to the upper cask 100b (see, e.g., FIG. 26).

With the canister 101 now positioned in the lower cask and lid in place, the thermo-siphon ventilation air system becomes activated due to the heat generated by the canister inside. Cool ambient air is drawn through the lower air inlet ducts 200, is heated by the nuclear waste and rises upwards through the ventilation annulus 122, and is then returned to atmosphere as heated ventilation air through the air outlet ducts 240 defined by the lid 114.

It bears noting that the same lid 114 may be compatible for use with and mounting to the lower or upper cask 100a, 100b. Accordingly, the lower cask 100a may include identical lid mounting features and details for securing the lid to the cask the same as those for the upper cask as previously described herein including threaded lid bolts 242, standoffs 241, threaded sockets 245, and lid mounting plates 246. This approach results in lid interchangeability and standardization while being a cost saving measure.

At a second point in time unconnected temporally from the time period in which the lower cask 100a is deployed and placed in operation (i.e. later than the first point in time such as for example days, weeks, months, or years later), additional storage capacity may be needed and added as required by installing one or more upper casks 100b on some or all of the lower casks 100a previously installed at the nuclear waste storage site (e.g., ISFSI or other). If not already done previously, the lower cask 100a is preferably anchored to the concrete pad S to provide stability for the double-high stacked cask assemblage to be formed for seismic event resistance. An empty and upwardly open upper cask 100b is first positioned on concrete pad S in a temporary staging area. A second canister 101 is loaded and inserted into the upper cask. The lid 114 on the lower cask 100a may be removed leaving an upwardly open cask ready for mounting upper cask 100b (see, e.g., FIG. 27). The removed lid 114 from the lower cask may then be installed and bolted on the top end 119 of the upper cask while still seated temporarily on the concrete pad S. Alternatively, a new lid of the same construction may be installed on the upper cask. The upper cask 100b may then be lifted and positioned on top of the respective lower cask 100a and bolted thereto. In an alternative lid installation approach, the removed lid 114 from the lower cask or a new lid may not be installed and bolted on the top end 119 of the upper cask until the upper cask is mounted onto the lower cask.

Figure 28:
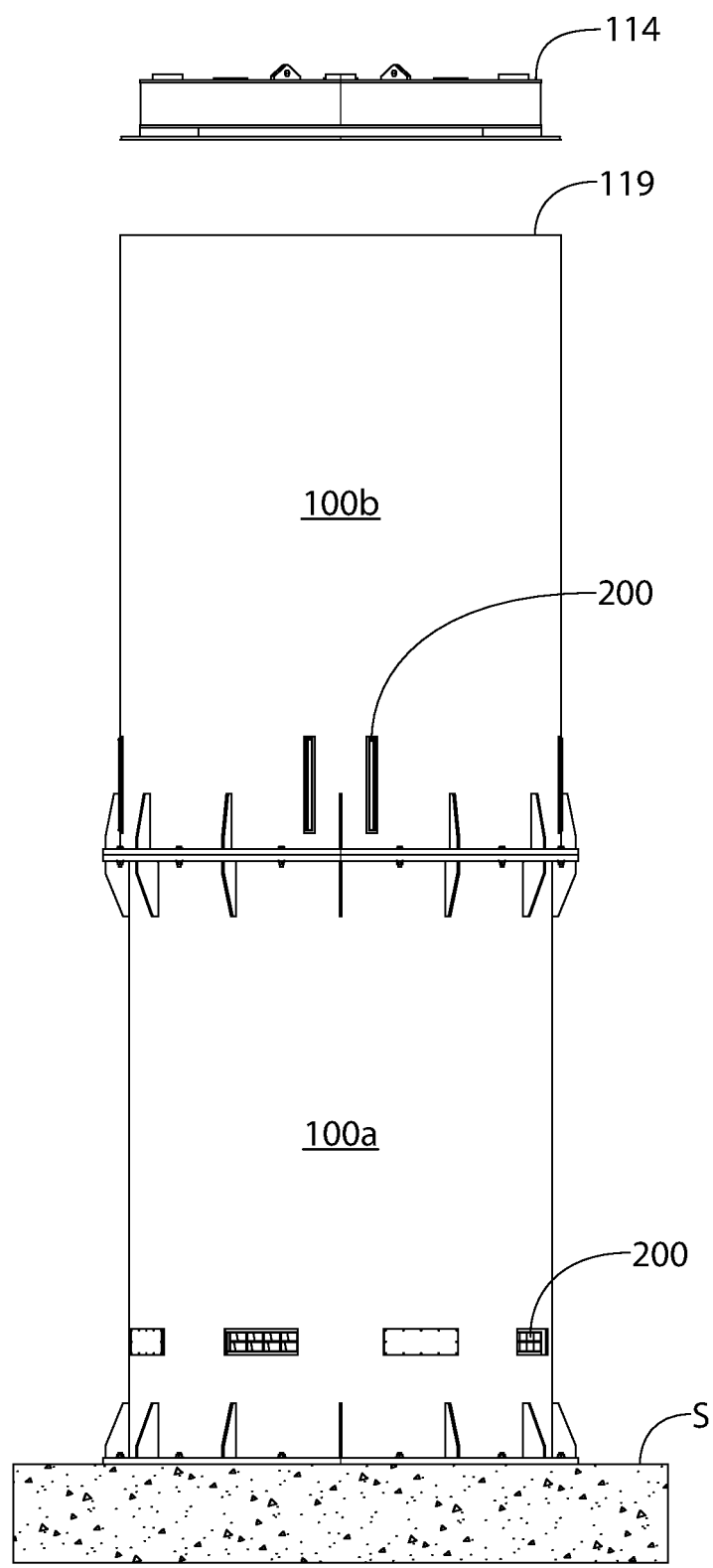
FIG. 28 is a side view showing the upper cask stacked and mounted atop the lower cask, the lid is in exploded view for clarity to show the top end of the upper cask.
Figure 29:
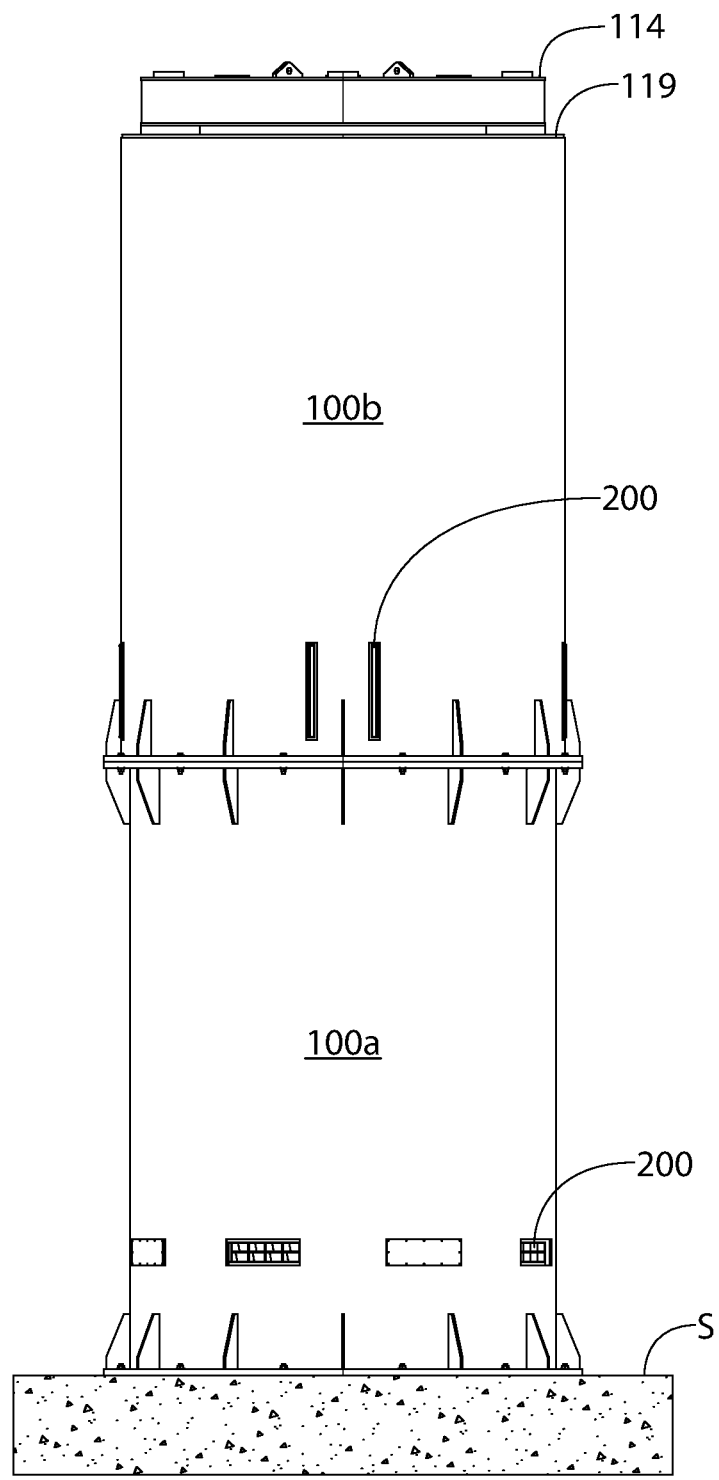
FIG. 29 is a side view of the stacked and fully mounted casks for operation and storage of the nuclear waste.

FIG. 28 shows the stacked and mounted tiered cask assembly with the lid raised off the upper cask 100b for clarify to show the top end of the upper cask. As noted above, the lid 114 on the upper cask may be installed either while the cask is seated on the concrete pad or after it is stacked on the lower cask. In either case, FIG. 29 shows the completed cask assembly with lid 114 fully mounted on the upper cask.

With the canister 101 now positioned in the upper cask 100b and its lid in place, the air ventilation system is activated which for the upper cask includes a combined thermo-siphon effect and venturi effect. The thermo-siphon effect is triggered by heat generated by the canister inside the cask as previously described herein. The venturi effect is triggered by the velocity of the rising and upward flowing heated stream received in the upper cask cavity 121 from the lower cask 100a below. Cool ambient air drawn through the upper air inlet ducts 220 via the venturi effect in part and thermo-siphon in part rises upwards through the ventilation annulus 122 of the upper cask 100b, and is then returned to atmosphere as further heated ventilation air through the air outlet ducts 240 defined by the lid 114. In addition, the ventilation air introduced into the upper cask via the upper air inlet ducts 220 of the cask system is mixed in the ventilation annulus 122 with the already heated ventilation received from the lower cask 100a below, as previously described herein. The combined and mixed ventilation air streams are thus discharged together from the lid on the upper cask.

In related alternative sequences and methods, a new lid 114 may be installed on the upper cask 100b while positioned on concrete pad S concurrently with the old lid remaining in place on the lower cask 100a while the second canister 101 is being loaded into the upper cask and the lid installed thereon. The lid on the lower cask may then be removed and the upper cask with lid in place may then be positioned on top of and bolted to the lower cask.

In a second deployment scenario of the stackable nuclear waste storage system, both the lower cask 100a and upper cask 100b may be intended to be installed at the storage site (e.g., ISFSI) at the same point in time and installation process initially. This method or process includes positioning the first lower cask 100a on the concrete pad S, preferably anchoring the cask to the pad to provide stability for the stacked cask assemblage taller than a single cask, and then loading/inserting the first nuclear waste canister 101 therein. At the same time if two cask crawlers are available at the site for use, or subsequently if only a single cask crawler is available, the second upper cask 100b is positioned on the concrete pad in a staging area and the second canister 101 is loaded/inserted therein.

In one option, the lid 114 may next be bolted to the top end of the upper cask 100b while still in contact with the concrete pad S. The upper cask with lid in place is then lifted and positioned on top of the lower cask 100a. The upper cask is then coupled (e.g., bolted) to the lower cask 100a. The thermo-siphon ventilation system is thus activated as previously described above.

In another option, the upper cask 100b without a lid in place is lifted and positioned on top of the lower cask 100a. The upper cask is then coupled (e.g., bolted) to the lower cask 100a. This may then be followed by mounting/coupling the lid 114 to the upper cask.

Numerous other variations in the sequence and/or methods described above with respect to each deployment scenario may be used. Other above grade stacked casks deployment scenarios may also be used with the stackable nuclear waste storage system disclosed herein.

It bears noting that the cask body 110 of the upper cask 100b is free of any air outlets (i.e. sidewall 118). The air outlet 240 is instead defined by the lid 114. It also bears noting that the cask boy 110 of lower cask 100a is free of any air outlets. When the lower cask might be used alone some operating scenarios described herein before the upper cask 300 is coupled thereto to add nuclear waste storage capacity, the air outlet 240 of the lower cask instead would be similarly defined by the cask lid 114.

In some embodiments, the sidewalls 118 of cask bodies 110 of both the lower and upper casks 100a, 100b may have a composite constructions which is the same. For example, each may have a cylindrical cask body 110 which is comprised of a single inner shell 112, an outer shell 111, and the radiation-shielding 113 disposed therebetween without an intermediate metallic shells in certain embodiments. The radiation-shielding material used in each cask body may be the same, such a concrete with or without hematite aggregate previously described herein. The wall thicknesses T1 and T2 of the cask bodies of the lower and upper casks may be the same to provide an identical degree of radiation shielding. To provide an internal cavity 121 having larger diameter D2 and concomitantly larger radial width W2 ventilation annulus 121 in the upper cask 100b than the lower cask 100a as previously described herein for cask ventilation purposes, the outside diameter OD2 of the upper cask (measured diametrically across and to the outer shell 111 at two opposite points) may be larger than the outside diameter D1 of lower cask 100a (see, e.g., FIGS. 14 and 17).

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A passively ventilated nuclear waste storage system comprising:
   a lower cask comprising:
      a first top end and a first bottom end;
      a first sidewall extending between the first top and first bottom ends, the first sidewall comprising a first outer shell and a first inner shell;
      a first internal cavity defined by the first inner shell of the first sidewall and having a first diameter, the first internal cavity extending between the first top and first bottom ends along a first cavity axis and configured for holding a first nuclear waste canister;
      at least one first air inlet duct configured to draw cooling air into a first bottom portion of the first internal cavity of the lower cask;
   an upper cask comprising:
      a second top end and a second bottom end;

a second sidewall extending between the second top and second bottom ends, the second sidewall comprising a second outer shell and a second inner shell;

a second internal cavity defined by the second inner shell of the second sidewall and having a second diameter, the second internal cavity extending between the second top and second bottom ends along a second cavity axis and configured for holding a second nuclear waste canister;

at least one outlet duct configured to allow heated air in a top portion of the second internal cavity to exit the second internal cavity of the upper cask; and the upper cask stacked atop the lower cask in a vertically stacked arrangement so that a cask-to-cask interface is formed between the upper and lower casks;

wherein the first and second internal cavities are fluidly interconnected so that heated air in a top portion of the first internal cavity can flow into a second bottom portion of the second internal cavity;

wherein the second diameter of the second internal cavity of the upper cask is larger than the first diameter of the first internal cavity of the lower cask.

2. The system according to claim 1, wherein the at least one first air inlet duct is a plurality of first air inlet ducts, and the plurality of first air inlet ducts are configured to draw ambient ventilation air for cooling the first nuclear waste canister into the first internal cavity of the lower cask.

3. The system according to claim 2, wherein the first air inlet ducts are configured to draw ambient ventilation air radially inwards into the first internal cavity in a circuitous path such that no straight line of sight exists between an external entrance opening at an outer surface of the lower cask and an internal exit opening at an inner surface of the lower cask of each of the first air inlet ducts.

4. The system according to claim 2, wherein the first top end of the lower cask is open and the upper cask comprises a perforated baseplate at the second bottom end of the upper cask which fluidly interconnects the first and second cavities.

5. The system according to claim 4, wherein the perforated baseplate includes a plurality of axial through holes configured to pass the ventilation air from the first internal cavity of the lower cask into the second internal cavity of the upper cask in an axially upwards direction.

6. The system according to claim 4, further comprising a plurality of spacer plates attached to a top of the perforated baseplate, the spacer plates configured to engage and elevate a bottom of the second nuclear waste canister above the perforated baseplate so that ventilation can flow beneath the second nuclear waste canister.

7. The system according to claim 4, wherein the lower cask comprises a baseplate having a solid closure structure which fluidly seals the first bottom end and the first internal cavity of the lower cask.

8. The system according to claim 7, wherein the baseplate of the lower cask and the perforated baseplate of the upper cask have a circular configuration.

9. The system according to claim 4, wherein a peripheral portion of the perforated baseplate of the upper cask defines an annular mounting flange which is detachably coupled to a mating annular mounting flange of an annular top flange plate affixed to the first top end of the lower cask.

10. The system according to claim 9, wherein the mounting flange of the upper cask is coupled to the mounting flange of the lower cask by a plurality of bolts.

11. The system according to claim 2, wherein the upper cask includes a plurality of second air inlet ducts configured to draw ambient ventilation air for cooling the second nuclear waste canister into the second internal cavity of the upper cask.

12. The system according to claim 11, wherein the second air inlet ducts of the upper cask are positioned to draw ambient ventilation air into the second bottom portion of the second internal cavity, and the first air inlet ducts of the lower cask are positioned to draw ambient ventilation air into the first bottom portion of the first internal cavity.

13. The system according to claim 12, wherein the upper cask is configured and operable to draw air into the second internal cavity of the upper cask through the second air inlet ducts by a venturi effect driven by a rising stream of heated air from the first internal cavity of the lower cask which flows upward through the upper cask.

14. The system according to claim 11, wherein the second air inlet ducts are configured to draw ambient ventilation air radially inwards into the second internal cavity in a circuitous path such that no straight line of sight exists between an external entrance opening and an internal exit opening of each of the second air inlet ducts in the upper cask.

15. The system according to claim 14, wherein the second air inlet ducts of the upper cask each have a vertically elongated shape.

16. The system according to claim 11, further comprising a radiation-shielded closure lid detachably coupled to the upper cask.

17. The system according to claim 16, wherein the closure lid defines the at least one outlet duct.

18. The system according to claim 17, wherein a ventilation air flow path is defined by the lower and upper casks in which ventilation air flows through the first air inlet ducts into the first internal cavity of the lower cask, rises upwards from the first internal cavity into the second internal cavity of the upper cask where the ventilation air is mixed with ventilation air which flows into the second internal cavity of the upper cask from the second air inlet ducts, and the mixed ventilation air is discharged back to ambient atmosphere via the closure lid on the upper cask.

19. The system according to claim 1, wherein each of the lower and upper casks comprises a vertically elongated cylindrical cask body containing a radiation shielding material.

20. The system according to claim 19, wherein each cask body includes a vertical sidewall comprising a cylindrical inner shell, a cylindrical outer shell, and an annular space formed therebetween, the radiation shielding material disposed in the annular space.

21. The system according to claim 19, wherein the radiation shielding material includes concrete containing hematite for enhancing heat transfer through the sidewall.

22. The system according to claim 1, wherein the first internal cavity of the lower cask has a height and transverse cross-sectional area configured to hold no more than the first nuclear waste canister therein, and the second internal cavity of the upper cask has a height and transverse cross-sectional area configured to hold no more than the second nuclear waste canister therein.

23. The system according to claim 1, further comprising a first ventilation annulus formed in the first internal cavity between an inner shell of the lower cask and the first nuclear waste canister, and a second ventilation annulus formed in the second internal cavity between an inner shell of the upper cask and the second nuclear waste canister, the second ventilation annulus having a greater radial width than the first ventilation annulus.

24. The system according to claim 1, wherein a baseplate of the lower cask affixed to the first bottom end thereof is bolted to a concrete pad.

\* \* \* \* \*